US008798115B2

United States Patent
Wang et al.

(10) Patent No.: US 8,798,115 B2
(45) Date of Patent: *Aug. 5, 2014

(54) CODE GENERATING APPARATUS, REFERENCE SIGNAL GENERATING APPARATUS, AND METHODS THEREOF

(71) Applicant: Fujitsu Limited, Kawasaki (JP)

(72) Inventors: Yi Wang, Beijing (CN); Yuantao Zhang, Beijing (CN); Hua Zhou, Beijing (CN); Jianming Wu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,756

(22) Filed: Nov. 22, 2013

(65) Prior Publication Data

US 2014/0079095 A1     Mar. 20, 2014

Related U.S. Application Data

(63) Continuation of application No. 13/544,475, filed on Jul. 9, 2012, which is a continuation of application No. PCT/CN2010/070087, filed on Jan. 8, 2010.

(51) Int. Cl.
*H04B 1/00* (2006.01)

(52) U.S. Cl.
USPC ........... 375/146; 375/135; 375/149; 375/150; 375/260; 375/262; 375/265; 375/267

(58) Field of Classification Search
CPC .... H04B 1/7073; H04B 1/709; H04B 1/7097; H04B 1/30; H04B 1/69; H04B 1/692; H04B 1/7075; H04B 1/71637; H04B 1/7176; H04W 72/0453; H04W 72/0466; H04W 72/04; H04W 72/0446; H04J 13/00; H04J 13/01

USPC ......... 375/141, 135, 146, 147, 149, 150, 260, 375/262, 265, 267; 370/203, 204, 205, 208, 370/209, 210

See application file for complete search history.

(56) References Cited

U.S. PATENT DOCUMENTS 7,095,778 B2 * 8/2006 Okubo et al. ................. 375/130
8,385,296 B2 * 2/2013 Lee ............................... 370/335

(Continued)

FOREIGN PATENT DOCUMENTS

| CN | 101133583 | 2/2008 |
|----|-----------|--------|
| CN | 101594160 | 12/2009 |

(Continued)

OTHER PUBLICATIONS

Notice of Preliminary Rejection and Results of KIPO Examination issued for corresponding Korean Patent Application No. 10-2012-7020801, mailed Sep. 27, 2013, with English translation.

(Continued)

*Primary Examiner* — Dhaval Patel
(74) *Attorney, Agent, or Firm* — Myers Wolin, LLC

(57) ABSTRACT

A code generating apparatus, demodulation reference signal generating apparatus, and methods thereof. The demodulation reference signal generator includes generating a non-correlation sequence for RS of a first resource block; spreading spectrums of elements in the non-correlation sequence for RS to be mapped to a first frequency resource of the first resource block, by using a first group of codes; second spreading spectrums of elements in the non-correlation sequence for RS to be mapped to a second frequency resource of the first resource block, by using a second group of Codes; the first and second frequency resources are adjacent frequency resources in frequency resource elements used for RS transmission in the first resource block, and the first and second groups of Codes are mirrors in column to each other; and mapping the spectrum-spread elements to the first and second frequency resources, respectively.

4 Claims, 15 Drawing Sheets

(56) References Cited

U.S. PATENT DOCUMENTS

| | | |
|---|---|---|
| 2002/0015437 A1 | 2/2002 | Li et al. |
| 2008/0157894 A1 | 7/2008 | Hariton et al. |
| 2009/0046646 A1 | 2/2009 | Cho et al. |
| 2009/0109917 A1 | 4/2009 | Pajukoski et al. |
| 2009/0209264 A1 | 8/2009 | Yang et al. |

FOREIGN PATENT DOCUMENTS

| | | |
|---|---|---|
| WO | 2005/011167 A1 | 2/2005 |
| WO | 2009/022293 | 2/2009 |
| WO | 2009/056464 | 5/2009 |

OTHER PUBLICATIONS

Text of the First Office Action issued for corresponding Taiwanese Patent Application No. 099114794, issued Mar. 12, 2013, with English translation.

Office Action issued for corresponding Japanese Patent Application No. 2012-547429, mailed Jan. 28, 2014, with an English translation.

Office Action issued for corresponding Chinese Patent Application No. 201080060993.1, dated May 6, 2014, with a partial English translation.

CATT, "Further investigation on DMRS design for LTE-A", Agenda Item: 7.3.2, Nov. 9-13, 2009, R1-094548, 3GPP TSG RAN WG1 Meeting #59, Jeju, Korea.

* cited by examiner

CODE GENERATING APPARATUS, REFERENCE SIGNAL GENERATING APPARATUS, AND METHODS THEREOF

CROSS-REFERENCE TO RELATED APPLICATIONS

This is a continuation of U.S. application Ser. No. 13/544,475, filed on Jul. 9, 2012, now pending, which is a continuation of International Application No. PCT/CN2010/070087, filed on Jan. 8, 2010 in The People's Republic of China, the entire contents of each are herein wholly incorporated by reference.

FIELD OF THE INVENTION

The present invention relates to transmission technologies in the wireless communication system, and more particularly, to a code generating apparatus, a reference signal generating apparatus, and methods thereof used in Long Term Evolution and Long Term Evolution-Advanced systems.

BACKGROUND OF THE INVENTION

The Long Term Evolution-Advanced (LTE-Advanced) next-generation wireless communication system of 3GPP requires the downlink to provide a peak rate of 1 Gps and a peak spectral efficiency of 30 bps/Hz, and this brings about challenges to the physical layer transmission scheme of the system. A multiple input multiple output (MIMO) multi-antenna system supports transmission of parallel data streams, thereby greatly enhancing the system throughput. Under general circumstances, independent forward error-correcting code encoding is firstly performed in parallel data streams transmitted in the multi-antenna system, and the encoded codeword is then mapped to one or more data transmission layers. When the codeword is mapped to plural transmission layers, it suffices to convert the serial data output from the encoder into corresponding plural layers. In one transmission, the number of all layers supported by the system is also referred to as the rank of the transmission. The process of converting the data of each layer into the data of each physical antenna is referred to as the pre-coding process of signals. LTE-Advanced Rel-10 supports the pre-coding technique with the maximum rank of 8.

In order for the receiving terminal to perform MIMO decoding and the associated demodulation, it is necessary for the transmitting side to transmit a pilot sequence, namely a demodulation reference signal (hereinafter referred to as "DMRS"), for estimating channels. Design of DMRSs requires that corresponding DMRSs of data transmission layers be orthogonal to one another, that is, to ensure that equivalent channels to the pre-coded channels of the transmission antennas are free of interference. In the Rel-10 system, corresponding DMRSs of the data transmission layers are differentiated by the frequency division multiplexing (FDM) and/or code division multiplexing (CDM) mode(s). Code division multiplexing is realized by spectrum-spreading sequences with ideal correlation via an orthogonal cover code (hereinafter referred to as "OCC") sequence. The OCC sequence is usually a Walsh sequence or a discrete Fourier transform (DFT) sequence.

As the inventors found during the process of the present invention, if an OCC sequence is mapped (spectrum-spread) in a time domain, it is usually presumed that channels on the physical resources corresponding to the cover code sequence are identical. Assume that the spread factor of a spectrum-spread sequence is M, it is then considered that channel responses of M number of OFDM symbols are identical. Such assumption is true only in a low-speed motion environment. With the increase in motion speed of a mobile station, the change in channel responses of the M number of OFDM symbols accordingly increases, and orthogonality of the spectrum-spread code is damaged, whereby data transmission layers interfere with one another, and the precision in channel estimation is lowered.

Moreover, in the Rel-10 system, DMRSs are subjected to the same pre-coding treatment as the data, and mapped to transmission antennas. The pre-coding treatment enables the DMRSs corresponding to the code-division multiplexed data transmission layers to be linearly stacked, and when DMRSs corresponding to M number of data transmission layers are stacked in the same direction, a signal with an amplitude of M is obtained; whereas when DMRSs corresponding to M number of data transmission layers are stacked in opposite directions, they counteract one another to obtain a signal with an amplitude of zero. If such power imbalance of each transmission antenna occurs in the entire frequency domain bandwidth, efficiency of transmission power will be markedly lowered.

As should be noted, the above introduction of the background is presented merely to facilitate clear and comprehensive explanation of the technical solutions of the present invention, and to make it easy for persons skilled in the art to comprehend. It should not be considered that these solutions are publicly known to persons skilled in the art only because they have been enunciated in the Background of the Related Art section of the present invention.

Reference documents of the present invention are listed below and herein incorporated by reference, as if they were described in detail in the Description of the present application.

1. [Patent Document 1]: Hooli Kari, Pajukoski Ka, et al., Method, apparatuses, system and related computer product for resource allocation (WO 2009056464 A1)
2. [Patent Document 2]: Che Xiangguang, Guo Chunyan, et al., Variable transmission structure for reference signals in uplink messages (WO 2009022293 A2)
3. [Patent Document 3]: Cho Joon-young, Zhang Jianzhong, et al., Apparatus and method for allocating code resource to uplink ACK/NACK channels in a cellular wireless communication system (US 2009046646 A1)
4. [Patent Document 4]: Yang Yunsong, Kwon Younghoon, System and method for adaptively controlling feedback information (US 20090209264 A1)
5. [Patent Document 5]: Pajukoski Kari P, Tiirola Esa, Providing improved scheduling request signaling with ACK/NACK or CQI (US 20090100917)
6. [Patent Document 6]: Li Don, Yang Guang, Multi-channel spread spectrum system (US 20020015437 A1).

SUMMARY OF THE INVENTION

Embodiments of the present invention are proposed in view of the aforementioned problems in the prior art to remove or alleviate one or more defects in the related art and at least to provide one advantageous choice. To achieve the above objectives, the present invention proposes the following aspects.

Aspect 1. A Reference Signal (RS) generator for generating a RS, which generator comprises a non-correlation sequence generator configured to generate a non-correlation sequence for RS of a first resource block; a first spectrum spreading unit configured to spread spectrums of elements in the non-correlation sequence for RS of the first resource block to be mapped to a first frequency resource of the first resource block, by using a first group of codes; a second spectrum spreading unit configured to spread spectrums of elements in the non-correlation sequence for RS of the first resource block to be mapped to a second frequency resource of the first resource block, by using a second group of Codes; the first and second frequency resources are adjacent frequency resources in frequency resource elements used for RS transmission in the first resource block, and the first and second groups of Codes are mirrors in column to each other; and a mapping unit configured to map the elements with their spectrums spread by the first and second spectrum spreading units to the first and second frequency resources of the first resource block, respectively. Wherein the frequency resource is composed of two pairs of consecutive 2 resource elements on a subcarrier.

Aspect 2. The RS generator according to Aspect 1, wherein the RS generator further comprises a third spectrum spreading unit configured to spread spectrums of elements in the non-correlation sequence for RS of the first resource block to be mapped to a third frequency resource, by using a third group of codes; a fourth spectrum spreading unit configured to spread spectrums of elements in the non-correlation sequence for RS of the first resource block to be mapped to a fourth frequency resource, by using a fourth group of codes; the third and fourth frequency resources are adjacent frequency resources in frequency resource elements used for RS transmission in the second resource block, and the third and fourth groups of codes are mirrors in column to each other; wherein the mapping unit further maps the elements with their spectrums spread by the third and fourth spectrum spreading units to the third and fourth frequency resources, respectively.

Aspect 3. The RS generator according to Aspect 2, wherein one of the third and fourth groups of codes is formed by performing a column vector cyclic shift to one of the first and second groups of codes.

Aspect 4. The RS generator according to Aspect 3, wherein the same column vector has different column serial numbers in the first to fourth groups of codes.

Aspect 5. The RS generator according to Aspect 1, wherein the non-correlation sequence generator generates a non-correlation sequence for RS of a second resource block, frequency resources used for RS of the first resource block and frequency resources used for RS of the second resource block is adjacent each other; the first spectrum spreading unit spreads spectrums of elements in the non-correlation sequence for RS of the second resource block to be mapped to a first frequency resource of the second resource block, by using the first group of codes; the second spectrum spreading unit spreads spectrums of elements in the non-correlation sequence for RS of the second resource block to be mapped to a second frequency resource of the second resource block, by using the second group of codes; the first and second frequency resources of the second resource block are adjacent frequency resources in frequency resource elements used for RS transmission in the first resource block; the mapping unit further maps the elements in the non-correlation sequence for RS of the second resource block with their spectrums spread by the first and second spectrum spreading units to the first and second frequency resources of the second resource block, respectively, wherein the first frequency resource of the second resource block corresponds to the first frequency resource or the second frequency resource of the first resource block, and the second frequency resource of the second resource block corresponds to the second frequency resource or the first frequency resource of the first frequency block, such that the elements in the non-correlation sequence for RS of the first resource block and/or the elements in the non-correlation sequence for RS of the second resource block to be mapped to the adjacent frequency resources in frequency resource elements used for RS transmission in the first resource block are spectrum-spread by the first group of codes and the second group of codes, respectively, in the first resource block and the second resource block.

Aspect 6. The RS generator according to Aspect 1, wherein the non-correlation sequence generator further generates a non-correlation sequence for RS of a second resource block, frequency resources used for RS of the first resource block and frequency resources used for RS of the second resource block is adjacent each other; the first spectrum spreading unit spreads spectrums of elements in the non-correlation sequence for RS of the second resource block to be mapped to a first frequency resource of the second resource block, by using the third group of codes; the second spectrum spreading unit spreads spectrums of elements in the non-correlation sequence for RS of the second resource block to be mapped to a second frequency resource of the second resource block, by using the fourth group of codes; the first and second frequency resources of the second resource block are adjacent frequency resources in frequency resource elements used for RS transmission in the first resource block; the fourth and third groups of codes are mirrors in column to each other; the mapping unit maps the elements in the non-correlation sequence for RS of the second resource block with their spectrums spread by the first and second spectrum spreading units to the first and second frequency resources of the second resource block, respectively, wherein the first frequency resource of the second resource block corresponds to the first frequency resource or the second frequency resource of the first resource block, and the second frequency resource of the second resource block corresponds to the second frequency resource or the first frequency resource of the first frequency block, such that the elements in the non-correlation sequence for RS of the first resource block and/or the elements in the non-correlation sequence for RS of the second resource block to be mapped to the adjacent frequency resources in frequency resource elements used for RS transmission in the first resource block are spectrum-spread by the first group of codes and the second group of codes, respectively, and such that the elements in the non-correlation sequence for RS of the first resource block and/or the elements in the non-correlation sequence for RS of the second resource block to be mapped to the adjacent frequency resources in frequency resource elements used for RS transmission in the second resource block are spectrum-spread by the third group of codes and the fourth group of codes, respectively, in the first resource block and the second resource block; one of the fourth and third groups of codes is formed by performing a column vector cyclic shift to one of the first and second groups of codes.

Aspect 7. The RS generator according to Aspect 6, wherein the same column vector has different column serial numbers in the first to fourth groups of codes.

Aspect 8. The RS generator according to Aspect 2, wherein the non-correlation sequence generator generates a non-correlation sequence for RS of a second resource block, frequency resources used for RS of the first resource block and frequency resources used for RS of the second resource block is adjacent each other; the first spectrum spreading unit spreads spectrums of elements in the non-correlation sequence for RS of the second resource block to be mapped to a first frequency resource of the second resource block, by using a fifth group of codes; the second spectrum spreading unit spreads spectrums of elements in the non-correlation sequence for RS of the second resource block to be mapped to a second frequency resource of the second resource block, by using a sixth group of codes; the first and second frequency resources of the second resource block are adjacent frequency resources in frequency resource elements used for RS transmission in the first resource block; the sixth and fifth groups of codes are mirrors in column to each other; the third spectrum spreading unit spreads spectrums of elements in the non-correlation sequence for RS of the second resource block to be mapped to a third frequency resource of the second resource block, by using a seventh group of codes; the fourth spectrum spreading unit spreads spectrums of elements in the non-correlation sequence for RS of the second resource block to be mapped to a fourth frequency resource of the second resource block, by using an eighth group of codes; the third and fourth frequency resources of the second resource block are adjacent frequency resources in frequency resource elements used for RS transmission in the second resource block; the seventh and eighth groups of codes are mirrors in column to each other; the mapping unit further maps the elements in the non-correlation sequence for RS of the second resource block with their spectrums spread by the first to fourth spectrum spreading units to the first to fourth frequency resources of the second resource block, respectively.

Aspect 9. The RS generator according to Aspect 8, wherein the same column vector has different column serial numbers in the fifth to eighth groups of codes; one of the fifth and sixth groups of codes is formed by performing a column vector cyclic shift to one of the first and second groups of codes by a first displacement, and one of the seventh and eighth groups of codes is formed by performing a column vector cyclic shift to one of the first and second groups of codes by a second displacement.

Aspect 10. The RS generator according to Aspect 1, wherein the first and second groups of codes are both Walsh code sequences or Fourier transform sequences.

Aspect 11. A Reference Signal (RS) generation method for generating a RS, which method comprises a non-correlation sequence generating step for generating a non-correlation sequence for RS of a first resource block; a first spectrum spreading step for spreading spectrums of elements in the non-correlation sequence for RS of the first resource block to be mapped to a first frequency resource of the first resource block, by using a first group of codes; a second spectrum spreading step for spreading spectrums of elements in the non-correlation sequence for RS of the first resource block to be mapped to a second frequency resource of the first resource block, by using a second group of codes; the first and second frequency resources are adjacent frequency resources in frequency resource elements used for RS transmission in the first resource block, and the first and second groups of codes are mirrors in column to each other; and a mapping step for mapping the elements with their spectrums spread by the first and second spectrum spreading steps to the first and second frequency resources of the first resource block, respectively.

Aspect 12. The RS generation method according to Aspect 11, wherein the RS generation method further comprises a third spectrum spreading step for spreading spectrums of elements in the non-correlation sequence for RS of the first resource block to be mapped to a third frequency resource, by using a third group of codes; a fourth spectrum spreading step for spreading spectrums of elements in the non-correlation sequence for RS of the first resource block to be mapped to a fourth frequency resource, by using a fourth group of codes; the third and fourth frequency resources are adjacent frequency resources in frequency resource elements used for RS transmission in the second resource block, and the third and fourth groups of codes are mirrors in column to each other; wherein the mapping step further maps the elements with their spectrums spread by the third and fourth spectrum spreading steps to the third and fourth frequency resources, respectively.

Aspect 13. The RS generation method according to Aspect 12, wherein one of the third and fourth groups of codes is formed by performing a column vector cyclic shift to one of the first and second groups of codes.

Aspect 14. The RS generation method according to Aspect 13, wherein the same column vector has different column serial numbers in the first to fourth groups of codes.

Aspect 15. The RS generation method according to Aspect 11, wherein the non-correlation sequence generating step generates a non-correlation sequence for RS of a second resource block, frequency resources used for RS of the first resource block and frequency resources used for RS of the second resource block is adjacent each other; the first spectrum spreading step spreads spectrums of elements in the non-correlation sequence for RS of the second resource block to be mapped to a first frequency resource of the second resource block, by using the first group of codes; the second spectrum spreading step spreads spectrums of elements in the non-correlation sequence for RS of the second resource block to be mapped to a second frequency resource of the second resource block, by using the second group of codes; the first and second frequency resources of the second resource block are adjacent frequency resources in frequency resource elements used for RS transmission in the first resource block; the mapping step further maps the elements in the non-correlation sequence for RS of the second resource block with their spectrums spread by the first and second spectrum spreading steps to the first and second frequency resources of the second resource block, respectively, wherein the first frequency resource of the second resource block corresponds to the first frequency resource or the second frequency resource of the first resource block, and the second frequency resource of the second resource block corresponds to the second frequency resource or the first frequency resource of the first frequency block, such that the elements in the non-correlation sequence for RS of the first resource block and/or the elements in the non-correlation sequence for RS of the second resource block to be mapped to the adjacent frequency resources in frequency resource elements used for RS transmission in the first resource block are spectrum-spread by the first group of codes and the second group of codes, respectively, in the first resource block and the second resource block.

Aspect 16. The RS generation method according to Aspect 11, wherein the non-correlation sequence generating step further generates a non-correlation sequence for RS of a second resource block, frequency resources used for RS of the first resource block and frequency resources used for RS of the second resource block is adjacent each other; the first spectrum spreading step spreads spectrums of elements in the non-correlation sequence for RS of the second resource block to be mapped to a first frequency resource of the second resource block, by using the third group of codes; the second spectrum spreading step spreads spectrums of elements in the non-correlation sequence for RS of the second resource block to be mapped to a second frequency resource of the second resource block, by using the fourth group of codes; the first and second frequency resources of the second resource block are adjacent frequency resources in frequency resource elements used for RS transmission in the first resource block; the fourth and third groups of codes are mirrors in column to each other; the mapping step maps the elements in the non-correlation sequence for RS of the second resource block with their spectrums spread by the first and second spectrum spreading steps to the first and second frequency resources of the second resource block, respectively, wherein the first frequency resource of the second resource block corresponds to the first frequency resource or the second frequency resource of the first resource block, and the second frequency resource of the second resource block corresponds to the second frequency resource or the first frequency resource of the first frequency block, such that the elements in the non-correlation sequence for RS of the first resource block and/or the elements in the non-correlation sequence for RS of the second resource block to be mapped to the adjacent frequency resources in frequency resource elements used for RS transmission in the first resource block are spectrum-spread by the first group of codes and the second group of codes, respectively, and such that the elements in the non-correlation sequence for RS of the first resource block and/or the elements in the non-correlation sequence for RS of the second resource block to be mapped to the adjacent frequency resources in frequency resource elements used for RS transmission in the second resource block are spectrum-spread by the third group of codes and the fourth group of codes, respectively, in the first resource block and the second resource block; one of the fourth and third groups of codes is formed by performing a column vector cyclic shift to one of the first and second groups of codes.

Aspect 17. The RS generation method according to Aspect 16, wherein the same column vector has different column serial numbers in the first to fourth groups of codes.

Aspect 18. The RS generation method according to Aspect 12, wherein the non-correlation sequence generating step generates a non-correlation sequence for RS of a second resource block, frequency resources used for RS of the first resource block and frequency resources used for RS of the second resource block is adjacent each other; the first spectrum spreading step spreads spectrums of elements in the non-correlation sequence for RS of the second resource block to be mapped to a first frequency resource of the second resource block, by using a fifth group of codes; the second spectrum spreading step spreads spectrums of elements in the non-correlation sequence for RS of the second resource block to be mapped to a second frequency resource of the second resource block, by using a sixth group of codes; the first and second frequency resources of the second resource block are adjacent frequency resources in frequency resource elements used for RS transmission in the first resource block; the sixth and fifth groups of codes are mirrors in column to each other; the third spectrum spreading step spreads spectrums of elements in the non-correlation sequence for RS of the second resource block to be mapped to a third frequency resource of the second resource block, by using a seventh group of codes; the fourth spectrum spreading step spreads spectrums of elements in the non-correlation sequence for RS of the second resource block to be mapped to a fourth frequency resource of the second resource block, by using an eighth group of codes; the third and fourth frequency resources of the second resource block are adjacent frequency resources in frequency resource elements used for RS transmission in the second resource block; the seventh and eighth groups of codes are mirrors in column to each other; the mapping step further maps the elements in the non-correlation sequence for RS of the second resource block with their spectrums spread by the first to fourth spectrum spreading steps to the first to fourth frequency resources of the second resource block, respectively.

Aspect 19. The RS generation method according to Aspect 18, wherein the same column vector has different column serial numbers in the fifth to eighth groups of codes; one of the fifth and sixth groups of codes is formed by performing a column vector cyclic shift to one of the first and second groups of codes by a first displacement, and one of the seventh and eighth groups of codes is formed by performing a column vector cyclic shift to one of the first and second groups of codes by a second displacement.

Aspect 20. The RS generation method according to Aspect 11, wherein the first and second groups of codes are both Walsh code sequences or Fourier transform sequences.

Aspect 21. An code generating apparatus, which comprises a basic orthogonal code acquiring device configured to acquire a group of basic orthogonal codes; a column cyclic shift unit configured to perform a column vector cyclic shift to the basic orthogonal codes generated by the basic orthogonal code acquiring device; and a mirror unit configured to perform a mirroring in column on the basic orthogonal codes generated by the basic orthogonal code acquiring device, so as to obtain a first basic orthogonal code group pair, and further configured to perform a mirroring in column on the basic orthogonal codes having undergone the cyclic shift by the column cyclic shift unit, so as to obtain a second code group pair.

Aspect 22. The code generating apparatus according to Aspect 21, wherein displacement of the column vector cyclic shift is variable.

Aspect 23. The code generating apparatus according to Aspect 21, wherein the code generating apparatus further comprises a group pair group acquiring unit configured to control the column cyclic shift unit and the mirror unit, so as to obtain a group of column serial number distinguishable code group pairs where the same column has different column serial numbers in different code groups.

According to the methods and apparatuses for generating codes proposed in the present invention, RS randomization may be enhanced, the problem of RS power imbalance may be removed, the requirement on orthogonality at the two dimensions of both the time and frequency may be satisfied, and more robust channel estimation properties may be provided.

With reference to the following description and the drawings, the above and further aspects and features of the present invention will come to be clearer. In the following description and the accompanying drawings, specific embodiments for embodying the invention are disclosed in greater detail, and modes of execution applicable to the principles of the present invention are pointed out. As should be noted, the present invention is not restricted in scope thereby. The present invention includes various variations, modifications and equalities within the spirits and provisos of the claims attached herewith.

Features described and/or illustrated with respect to one embodiment can be employed in one or more other embodiments, combined with features of other embodiments, or replace features of other embodiments in identical or similar ways.

As should be stressed, the terms of "comprise/include" and "comprising/including", as used in this disclosure, indicates the existence of features, integral, steps or component parts, and does not exclude the existence or addition of one or more other features, integral, steps or component parts.

BRIEF DESCRIPTION OF THE DRAWINGS

The aforementioned as well as other objectives, features and advantages of the present invention will become more apparent by virtue of the subsequent description with reference to the drawings, in which.

DETAILED DESCRIPTION OF THE EMBODIMENTS

Preferred embodiments of the present invention are described in greater detail below with reference to the drawings. Details and functions unnecessary to the present invention are not mentioned in the description to avoid confused comprehension of the present invention.

Figure 1A:
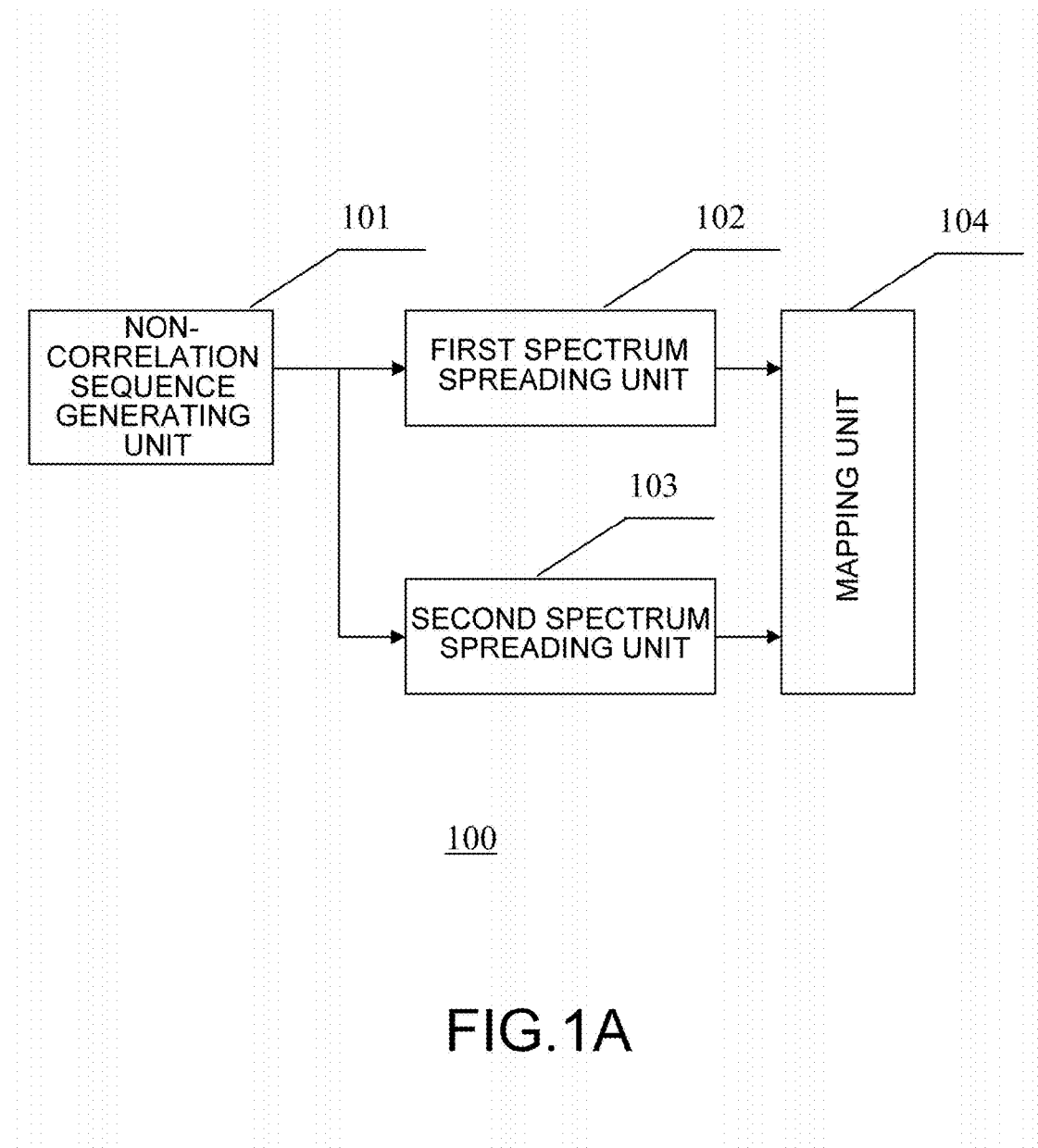
FIG. 1A is a schematic diagram illustrating a reference signal (RS) generating apparatus according to one embodiment of the present invention.

FIG. 1A is a schematic diagram illustrating a demodulation reference signal (DMRS) generating apparatus according to one embodiment of the present invention. The DMRS is an example of reference signals (RS) used for demodulation. As shown in FIG. 1A, the DMRS generating apparatus 100 according to one embodiment of the present invention includes a non-correlation sequence generating unit 101, a first spectrum spreading unit 102, a second spectrum spreading unit 103 and a mapping unit 104.

The non-correlation sequence generating unit 101 is configured to generate a non-correlation sequence for RS, which sequence should have ideal correlation (relatively small or even zero). The non-correlation sequence in this context is for instance a Zadoff-Chu sequence or a PN code sequence. Any methods already known or to be known to persons skilled in the art can be used to generate the non-correlation sequence such as the Zadoff-Chu sequence or the PN code sequence, and are not extensively described here. For example, the non-correlation sequence generating unit 101 generates a non-correlation sequence (a, c) for a certain resource block.

The first spectrum spreading unit 102 is configured to spread spectrums of elements (a, for instance) in the non-correlation sequence for RS to be mapped to a first frequency resource by using a first group of codes, where orthogonal cover codes (OCCs) may be used as the codes.

The second spectrum spreading unit 103 is configured to spread spectrums of elements (c, for instance) in the non-correlation sequence for RS to be mapped to a second frequency resource by using a second group of codes. The second frequency resource and the first frequency resource are adjacent frequency resources in frequency resource elements used for RS transmission in the first resource block, and the second group of codes and the first group of codes are mirrors in column to each other. The first group of codes and the second group of codes can be referred to as code group pairs.

The mapping unit 104 is configured to map the elements in the non-correlation sequence for RS with their spectrums spread by the first and second spectrum spreading units to corresponding frequency resources, namely to the first and second frequency resources, respectively.

In one embodiment, the first group of codes and the second group of codes are Walsh codes. In another embodiment, the first group of codes and the second group of codes are discrete Fourier transform (DFT) sequences. Any other known code sequences may as well be used for the first group of codes and the second group of codes. To facilitate description, the Walsh codes are only taken as example for description.

Figure 2:
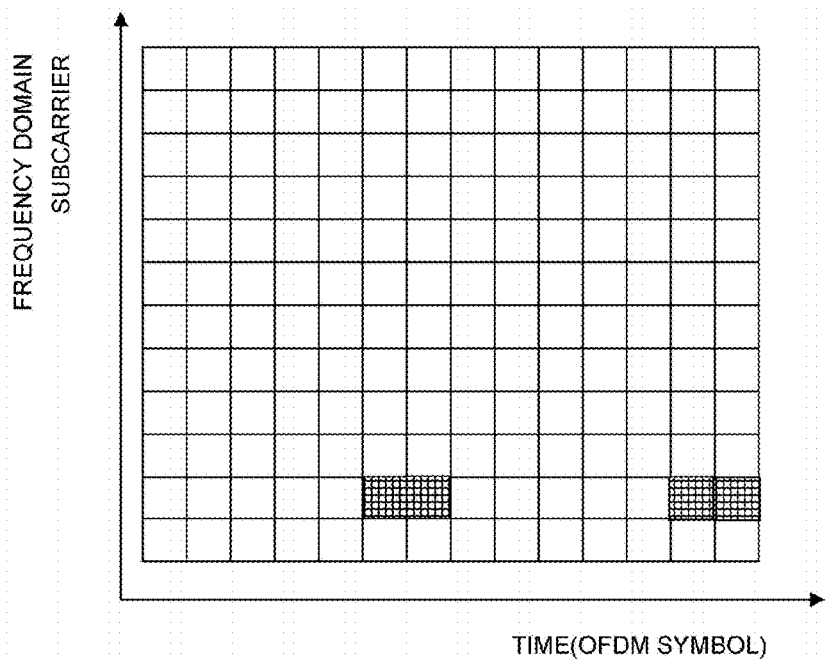
FIGS. 2 and 3 illustrate one advantage of the RS generating apparatus according to the present invention.
Figure 3:
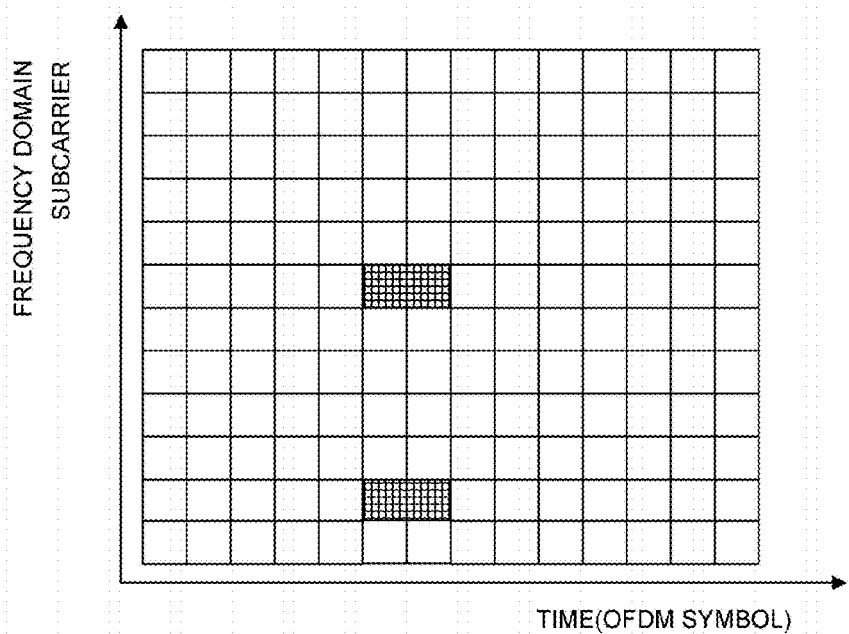

FIGS. 2 and 3 illustrate one advantage of the RS generating apparatus according to the present invention. When four RS signals are used, as shown in FIG. 2, only one group of codes having a spectrum-spreading length of 4 (a, −a, a, −a or c, −c, c, −c) at the time domain is used in the related art. As shown in FIG. 3, when the DMRS generating apparatus according to the embodiment of the present invention is used, it is possible to map the four RS signals to two subcarriers respectively, so as to reduce the spectrum-spreading length to 2 at the time domain, thereby reducing the requirement on motion speed of the mobile station.

On the other hand, it is also possible to make the power distribution more uniform, and this will be described below. The present invention does not aim to solve all technical problems existent in the related art in one embodiment, and it is unnecessary to contain all technical advantages mentioned in the invention in one embodiment.

Described below is the generation of the code sequences.

Figure 4:
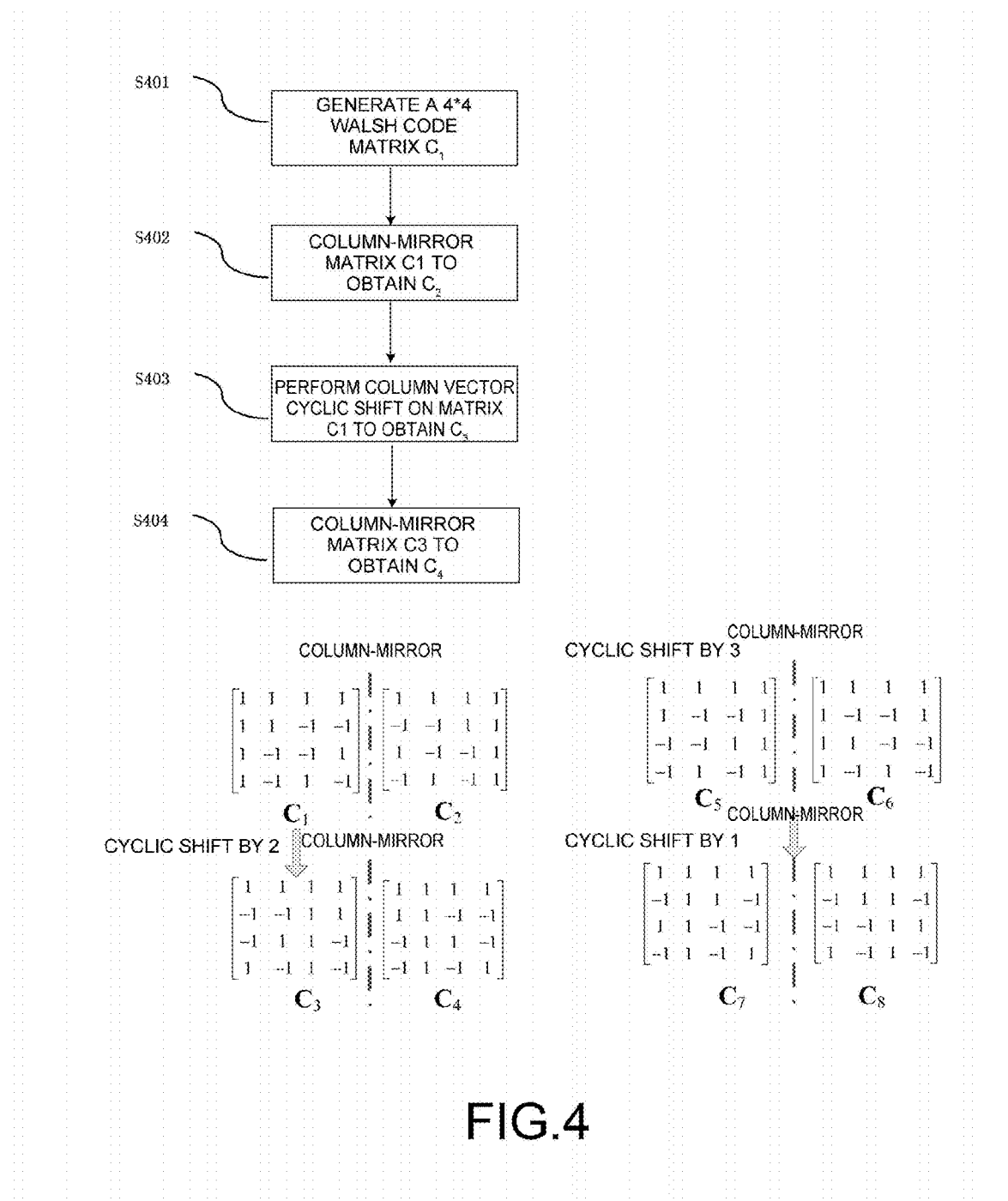
FIG. 4 is a schematic diagram illustrating the flow of generating code group pairs by the method according to the present invention.

FIG. 4 is a schematic diagram illustrating the flow of generating 0° C. group pairs by the method according to the present invention. Altogether eight groups of code sequences are generated in the example illustrated in FIG. 4, each code sequence includes four orthogonal sequences, and each orthogonal sequence has a length of 4. The code sequences generated in this illustrated example are Walsh sequences. As should be noted, the numbers 4 and 8 in this context are used merely for the purpose of clarity of the description, rather than to restrict the protection scope of the present invention.

As shown in FIG. 4, the following steps are specifically included.

Step S401—generating a group of code sequence. The circumstance illustrated in FIG. 4 is represented by a matrix $C_1=[C_{1,1}; C_{1,2}; C_{1,3}; C_{1,4}]$. This group of code sequence (code group) includes four orthogonal sequences orthogonal to one another and each having a length of 4:

$$C_{1,n} = \begin{Bmatrix} C_{1,n}(1) \\ C_{1,n}(2) \\ C_{1,n}(3) \\ C_{1,n}(4) \end{Bmatrix}$$

For example, in FIG. 4 there are $$C_{1,1} = \begin{Bmatrix} C_{1,1}(1) \\ C_{1,1}(2) \\ C_{1,1}(3) \\ C_{1,1}(4) \end{Bmatrix} = \begin{Bmatrix} 1 \\ 1 \\ 1 \\ 1 \end{Bmatrix}$$

$$C_{1,2} = \begin{Bmatrix} C_{1,2}(1) \\ C_{1,2}(2) \\ C_{1,2}(3) \\ C_{1,2}(4) \end{Bmatrix} = \begin{Bmatrix} 1 \\ 1 \\ -1 \\ -1 \end{Bmatrix}$$

and so on so forth.

Step S402—subjecting the group of code sequence C1 to a column mirror treatment to obtain a new group of code sequence $C_2=[C_{2,1}; C_{2,2}; C_{2,3}; C_{2,4}]=[C_{1,4}; C_{1,3}; C_{1,2}; C_{1,1}]$.

Thus obtained is a pair of code groups (code group pair) used in cooperation with each other.

Further, when more cooperatively used pairs of code groups are required, the method can also include the following steps.

Step S403—subjecting the group of orthogonal sequence $C_1$ to a column vector cyclic shift treatment to obtain a new group of code sequence $C_3=[C_{3,1}; C_{3,2}; C_{3,3}; C_{3,4}]$; and then Step S404—subjecting the group of code sequence $C_3$ to a column mirror treatment to obtain another new group of code sequence $C_4=[C_{4,1}, C_{4,2}; C_{4,3}; C_{4,4}]$.

Cyclic displacement p in the column vector cyclic shift treatment is variable. For instance, under the circumstance shown in FIG. 4, the cyclic displacement p may be equal to 1, 2 and 3. Accordingly, when more cooperative group pairs are required, Steps S403 and S404 can be repeated for several times, and the cyclic displacement p is varied each time.

FIG. 4 illustrates the resultant $C_3$ and $C_4$ when p=2. FIG. 4 also illustrates the resultant another pair of code groups $C_5$ and $C_6$ when p=3, as well as still another pair of code groups $C_7$ and $C_8$ when p=1.

Preferably, when it is required to select two pairs of code groups, the same column vector of the code sequences can be made different in column serial numbers in every two pairs of code groups, namely to form a group of column serial number distinguishable cover code vector group pairs. Taking for example the all-1 column vectors in the illustrated example, it corresponds to the first, the fourth, the third and the second columns in $C_1$~$C_4$, respectively, while corresponds to the fourth, the first, the second and the third columns in $C_5$~$C_8$, respectively, and the matrices of these eight groups of code sequences are not equal to one another, so that $C_1$~$C_4$ can be used together, and $C_5$~$C_8$ can be used together. The $C_1$~$C_4$ in this context make up a group of column serial number distinguishable cover code vector group pairs, and $C_5$~$C_8$ make up a group of column serial number distinguishable cover code vector group pairs. Likewise, the all-1 column vectors in $C_1$, $C_2$, $C_7$ and $C_8$ are respectively in the first, the fourth, the second and the third columns, while the all-1 column vectors in $C_3$, $C_4$, $C_5$ and $C_6$ are respectively in the third, the second, the fourth and the first columns, so that $C_3$, $C_4$, $C_5$ and $C_6$ can be used together, and $C_1$, $C_2$, $C_7$ and $C_8$ can be used together. $C_3$, $C_4$, $C_5$ and $C_6$ also make up a group of column serial number distinguishable cover code vector group pairs, and $C_1$, $C_2$, $C_7$ and $C_8$ also make up a group of column serial number distinguishable cover code vector group pairs. The advantage in using the groups of column serial number distinguishable cover code vector group pairs rests in enabling uniform power distribution on each RS-transmitting frequency resource, and this will be described later.

It is possible to select the groups of column serial number distinguishable cover code vector group pairs by a certain method after all of code group pairs have been obtained, and it is also possible to select suitable code group pairs and discard unsuitable pairs of code groups by adding a determining step after performing each round of cyclic shift to determine whether a group of column serial number distinguishable cover code vector group pairs is made up.

In the eight groups of code sequences as generated, vectors formed by elements in each of the pairs of code groups (pairs of code sequence matrix groups) $C_1$ with $C_2$, $C_3$ with $C_4$, $C_5$ with $C_6$ and $C_7$ with $C_8$ satisfy the relationship of being orthogonal to one another. Taking $C_1$ with $C_2$ for example, $[C_{11}, C_{12}, C_{21}, C_{22}]$ are orthogonal to each other, $[C_{13}, C_{14}, C_{23}, C_{24}]$ are also orthogonal, and so on. As can be seen, pairs of code groups obtained as thus can achieve orthogonality of the two dimensions of both frequency and time.

Figure 1B:
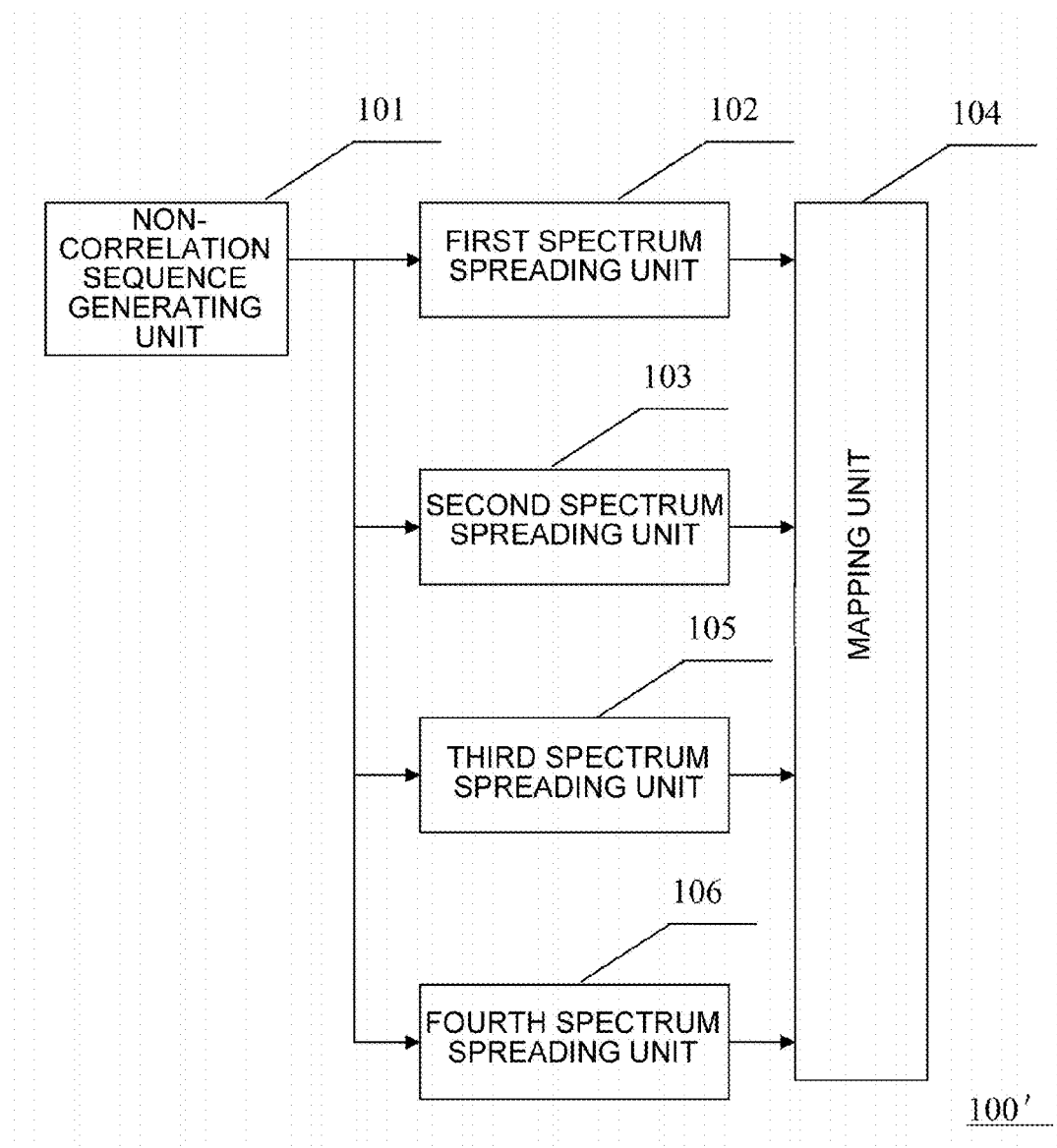
FIG. 1B is a schematic diagram illustrating a RS generating apparatus according to one embodiment of the present invention.

FIG. 1B is a schematic diagram illustrating a DMRS generating apparatus according to another embodiment of the present invention. As shown in FIG. 1B, the DMRS generating apparatus 100' according to another embodiment of the present invention further includes, in addition to the non-correlation sequence generating unit 101, the first spectrum spreading unit 102, the second spectrum spreading unit 103 and the mapping unit 104 as shown in FIG. 1A, a third spectrum spreading unit 105 and a fourth spectrum spreading unit 106.

In the DMRS generating apparatus 100' according to this embodiment, the non-correlation sequence generator generates a non-correlation sequence for RS, for instance a non-correlation sequence (a, b, c, d) for RS.

The first spectrum spreading unit 102 is configured to spread spectrums of elements (a, for instance) in the non-correlation sequence for RS to be mapped to a first frequency resource by using a first group of codes ($C_1$, for instance).

The second spectrum spreading unit 103 is configured to spread spectrums of elements (c, for instance) in the non-correlation sequence for RS to be mapped to a second frequency resource by using a second group of codes ($C_2$, for instance). The second frequency resource and the first frequency resource are adjacent frequency resources in frequency resource elements used for RS transmission in the first resource block, and the second group of codes and the first group of codes are mirrors in column to each other. The first group of codes and the second group of codes can be referred to as code group pairs. The first group of frequency resource elements used for RS transmission is for instance RS of the first, the second, the fifth and the sixth layers. In this disclosure, when it says that both the second frequency resource and the first frequency resource are frequency resources in frequency resource elements used for RS transmission in the first resource block, it means that RS carried by the two frequency resources are used for the first group of frequency resource elements used for RS transmission.

The third spectrum spreading unit 105 is configured to spread spectrums of elements (b, for instance) in the non-correlation sequence for RS to be mapped to a third frequency resource by using a third group of codes ($C_3$, for instance).

The fourth spectrum spreading unit 106 is configured to spread spectrums of elements (d, for instance) in the non-correlation sequence for RS to be mapped to a fourth frequency resource by using a fourth group of codes ($C_4$, for instance). The third frequency resource and the fourth frequency resource are adjacent frequency resources in frequency resource elements used for RS transmission in the second resource block, and the third group of codes and the fourth group of codes are mirrors in column to each other. In this disclosure, when it says that both the third frequency resource and the fourth frequency resource are frequency resources in frequency resource elements used for RS transmission in the second resource block, it means that RS carried by the two frequency resources are used for the second group of frequency resource elements used for RS transmission. The second group of RS is for instance RS of the third, the fourth, the seventh and the eighth layers.

Preferably, the first group of codes and the second group of codes as well as the third group of codes and the fourth group of codes make up groups of column serial number distinguishable code group pairs, like the above-illustrated circumstances in which $C_1$, $C_2$ are combined with $C_3$ and $C_4$. However, this is not necessarily so, as it is also possible to combine $C_1$, $C_2$ with $C_6$ and $C_6$, for instance.

Figure 5A:
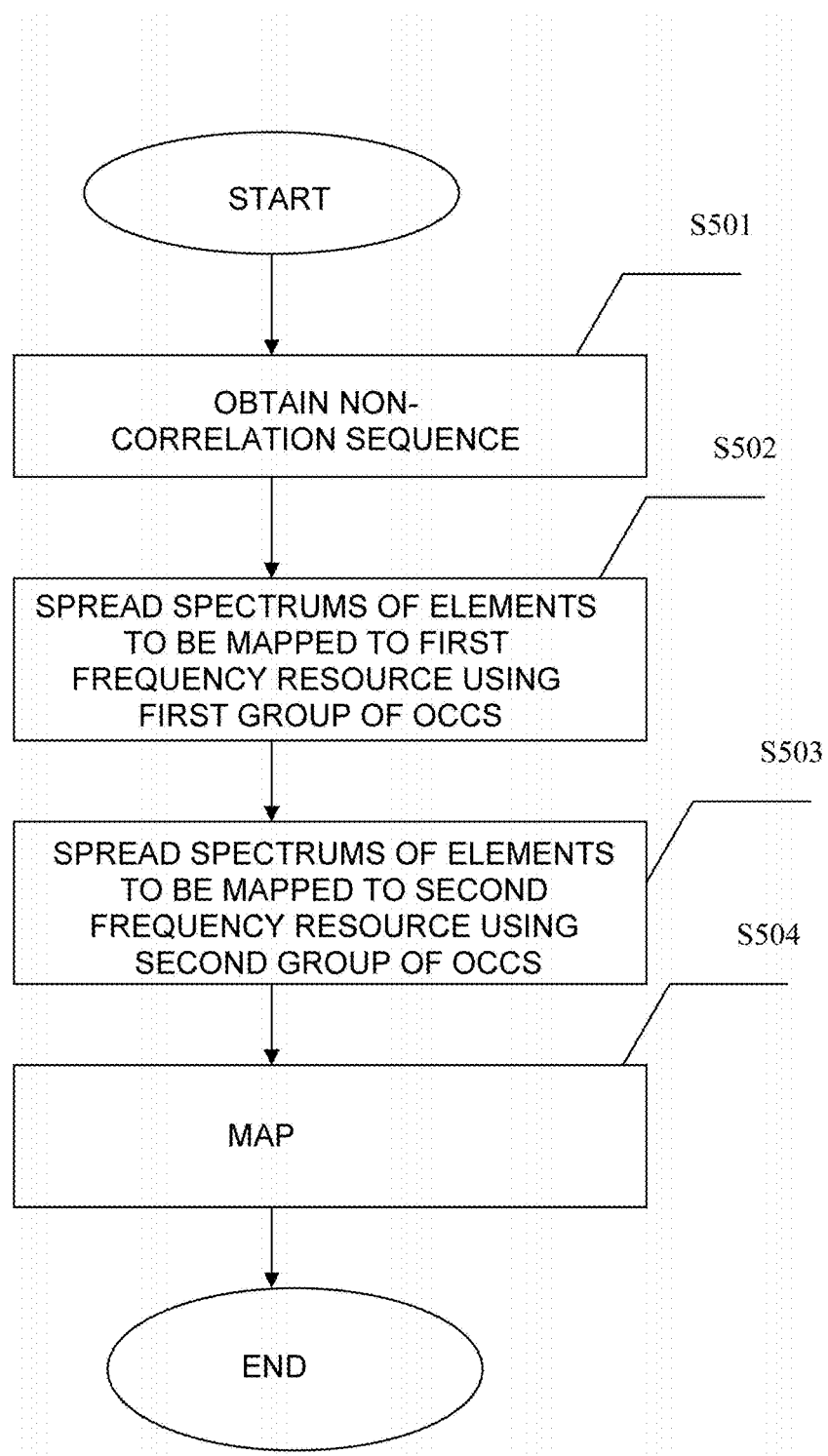
FIG. 5A is a flow chart illustrating a RS generation method according to one embodiment of the present invention.

FIG. 5A is a flow chart illustrating a DMRS generation method according to one embodiment of the present invention.

As shown in FIG. 5A, firstly in Step S501 the non-correlation sequence generating unit 101 generates a non-correlation sequence for RS. The non-correlation sequence for RS in this context is for instance a Zadoff-Chu sequence or a PN code sequence. Any methods already known or to be known to persons skilled in the art can be used to generate the non-correlation sequence such as the Zadoff-Chu sequence or the PN code sequence, and are not extensively described here.

In Step S502, the first spectrum spreading unit 102 spreads spectrums of elements in the non-correlation sequence to be mapped to a first frequency resource by using a first group of codes.

In Step S503, the second spectrum spreading unit 103 spreads spectrums of elements in the non-correlation sequence to be mapped to a second frequency resource by using a second group of codes. The second frequency resource and the first frequency resource are adjacent frequency resources in the same group of frequency resource elements used for RS transmission, and the second group of codes and the first group of codes are mirrors in column to each other. The first group of codes and the second group of codes can be referred to as code group pair.

Thereafter in Step S504, the mapping unit 104 maps the elements in the non-correlation sequence for RS with their spectrums spread by the first and second spectrum spreading units to corresponding frequency resources, namely to the first and second frequency resources, respectively.

As easily conceivable, Steps S502 and S503 can be performed either successively or concurrently.

Figure 5B:
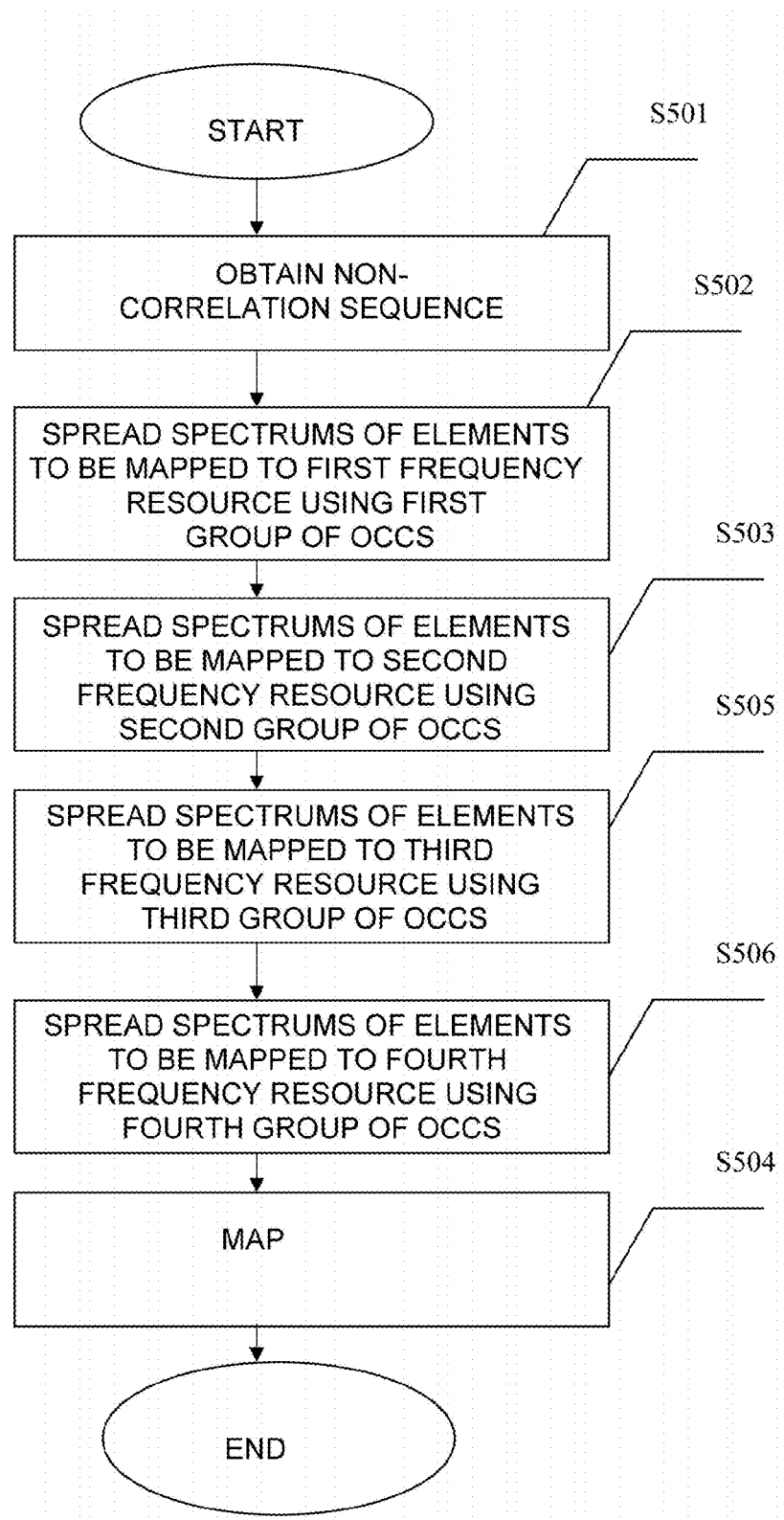
FIG. 5B is a schematic diagram illustrating the flow of a RS generation method according to another embodiment of the present invention.

FIG. 5B is a schematic diagram illustrating a DMRS generation method according to another embodiment of the present invention.

As shown in FIG. 5B, according to the DMRS generation method of an embodiment of the present invention, firstly in Step S501, a non-correlation sequence for RS is generated, which sequence should have ideal correlation (relatively small or even zero). The non-correlation sequence in this context is for instance a Zadoff-Chu sequence or a PN code sequence.

Then in Step S502, the first spectrum spreading unit spreads spectrums of elements in the non-correlation sequence for RS to be mapped to a first frequency resource by using a first group of codes.

In Step S503, the second spectrum spreading unit spreads spectrums of elements in a plurality of first non-correlation sequences to be mapped to a second frequency resource by using a second group of codes. The second frequency resource and the first frequency resource are adjacent frequency resources in frequency resource elements used for RS transmission in the first resource block, and the second group of codes and the first group of codes are mirrors in column to each other.

Unlike the DMRS generation method shown in FIG. 5A, the DMRS generation method shown in FIG. 5B further includes Steps S505 and S506.

In Step S505, the third spectrum spreading unit spreads spectrums of elements in the non-correlation sequence for RS to be mapped to a third frequency resource by using a third group of codes.

In Step S506, the fourth spectrum spreading unit spreads spectrums of elements in the non-correlation sequence for RS to be mapped to a fourth frequency resource by using a fourth group of codes. The fourth frequency resource and the third frequency resource are adjacent frequency resources in frequency resource elements used for RS transmission in the second resource block, and the fourth group of codes and the third group of codes are mirrors in column to each other.

And preferably, the groups of group pairs formed by the fourth group of codes and the third group of codes as well as by the first group of codes and the second group of codes make up groups of column serial number distinguishable code group pairs.

In Step S504, the mapping unit 104 maps the elements in the non-correlation sequence for RS with their spectrums spread by the first to fourth spectrum spreading units to corresponding frequency resources, namely to the first to fourth frequency resources, respectively.

As easily conceivable, Steps S502, S503, S505 and S506 can be performed either successively or concurrently.

Figure 6:
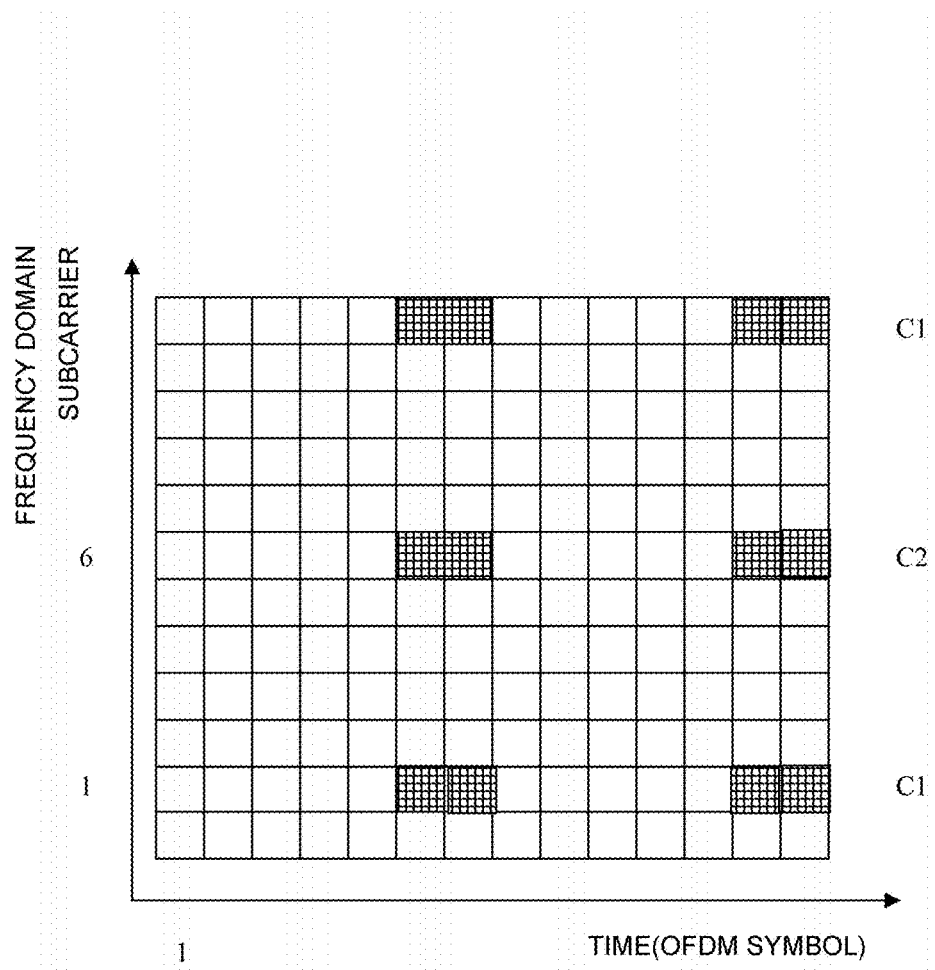
FIG. 6 is a schematic diagram illustrating an example of downlink RS resources generated by using the RS generation method according to the present invention.

FIG. 6 is a schematic diagram illustrating an example of downlink DMRS resources generated by using the DMRS generation method according to the present invention.

FIG. 6 illustrates a circumstance in which there are two layers. Assume that the RSs occupy twelve subcarriers (also referred to as "resource elements", RE) in physical resource blocks (PRB) of the sixth and seventh OFDM symbols and the thirteenth and fourteenth OFDM symbols in each subframe of the LTE-A system. The RSs of the first and second layers occupy the same PRB, and are differentiated via codes each having a length of 2.

Under such a circumstance, after the non-correlation sequence for RS (such as a, b, c) is generated, the first group of codes is used to spread spectrums of elements (a, for instance) in the non-correlation sequence for RS to be mapped to a first subcarrier in frequency resource elements used for RS transmission in the first resource block (RS of the first and second layers), the second group of codes is used to spread spectrums of elements (b, for instance) in the non-correlation sequence for RS to be mapped to a sixth subcarrier (which is also in frequency resource elements used for RS transmission in the first resource block), and the first group of codes is used to spread spectrums of elements (c, for instance) in the non-correlation sequence for RS to be mapped to an eleventh subcarrier (which is also in frequency resource elements used for RS transmission in the first resource block). Mapping is performed thereafter.

The first group of codes and the second group of codes are mirrors in column to each other, that is, they form a pair of code groups.

In this context, although the first, the sixth and the eleventh subcarriers as exemplarily illustrated are not physically adjacent, because they are in frequency resource elements used for RS transmission associated with the same layers, they are adjacent insofar as they are in frequency resource elements used for RS transmission associated with the same layers, so they are referred to as adjacent frequency resources in frequency resource elements used for RS transmission in the first resource block.

Figure 7:
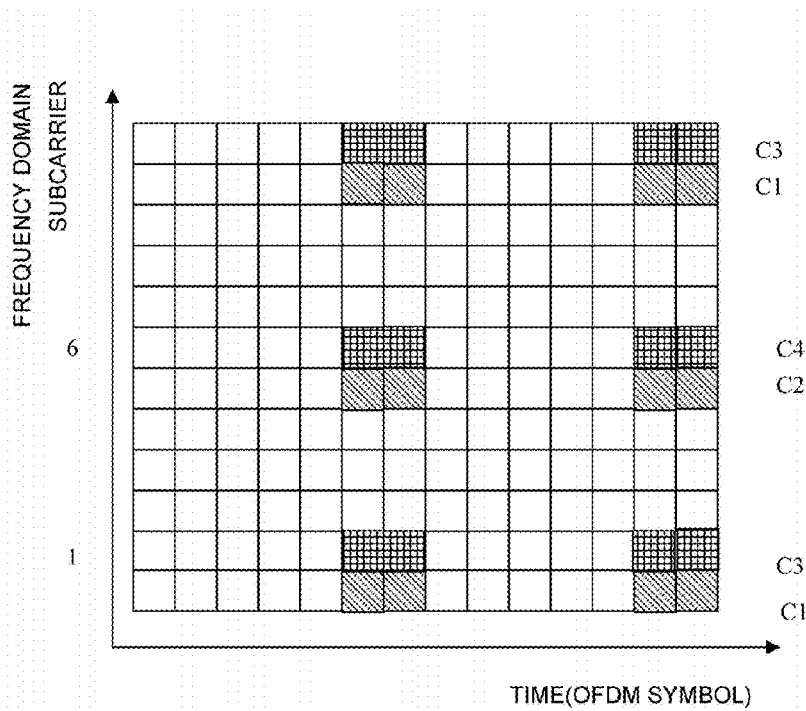
FIG. 7 is a schematic diagram illustrating another example of downlink RS resources generated by using the RS generation method according to the present invention.

FIG. 7 is a schematic diagram illustrating another example of downlink RS resources generated by using the RS generation method according to the present invention.

FIG. 7 illustrates a circumstance in which there are four layers. Assume that the RSs occupy twenty-four subcarriers (also referred to as "resource elements", RE) in physical resource blocks (PRB) of the sixth and seventh OFDM symbols and the thirteenth and fourteenth OFDM symbols in each subframe of the LTE-A system. The RSs of the first and second layers occupy the same PRB, and are differentiated via codes each having a length of 2. The RSs of the third and fourth layers occupy the same PRB, and are differentiated via codes each having a length of 2.

Under such a circumstance, after the non-correlation sequence for RS is generated, the first group of codes ($C_1$, for instance) is used to spread spectrums of elements in the non-correlation sequence for RS to be mapped to a $0^{th}$ subcarrier with respect to the first and second layers, the second group of codes ($C_2$, for instance) is used to spread spectrums of elements in the non-correlation sequence for RS to be mapped to a fifth subcarrier with respect to the first and second layers, and the first group of codes is used to spread spectrums of elements in the non-correlation sequence for RS to be mapped to a tenth subcarrier with respect to the first and second layers. The third group of codes ($C_3$, for instance) is used to spread spectrums of elements in the non-correlation sequence for RS to be mapped to a first subcarrier with respect to the third and fourth layers, the fourth group of codes ($C_4$, for instance) is used to spread spectrums of elements in the non-correlation sequence for RS to be mapped to a sixth subcarrier with respect to the third and fourth layers, and the third group of codes is used to spread spectrums of elements in the non-correlation sequence for RS to be mapped to an eleventh subcarrier with respect to the third and fourth layers. Mapping is performed thereafter.

The first group of codes and the second group of codes are mirrors in column to each other, that is, they form a pair of code groups. The third group of codes and the fourth group of codes are mirrors in column to each other, that is, they also form a pair of code groups. The first and second layers can be differentiated from the third and fourth layers in the form of FDM, that is, they are differentiated by frequencies.

As should be noted, the pair of code groups formed by the first group of codes and the second group of codes can either be identical with or different from the pair of code groups formed by the third group of codes and the fourth group of codes.

When there are more than four layers, the method can also be carried out in the similar way as shown in FIG. 7. That is to say, frequency resources that carry RS are divided into two groups with respect to different layers, and elements in the non-correlation sequence for RS mapped to each of the groups are spectrum-spread by different groups of codes. Different groups are differentiated by frequencies.

For instance, also in the pattern of RS resources illustrated in FIG. 7, after the non-correlation sequence for RS is generated, the first group of codes is used to spread spectrums of elements in the non-correlation sequence for RS to be mapped to the $0^{th}$ subcarrier with respect to the first to fourth layers, the second group of codes is used to spread spectrums of elements in the non-correlation sequence for RS to be mapped to the fifth subcarrier with respect to the first to fourth layers, and the first group of codes is used to spread spectrums of elements in the non-correlation sequence for RS to be mapped to the tenth subcarrier with respect to the first to fourth layers. The third group of codes is used to spread spectrums of elements in the non-correlation sequence for RS to be mapped to the first subcarrier with respect to the fifth to eighth layers, the fourth group of codes is used to spread spectrums of elements in the non-correlation sequence for RS to be mapped to the sixth subcarrier with respect to the fifth to eighth layers, and the third group of codes is used to spread spectrums of elements in the non-correlation sequence for RS to be mapped to the eleventh subcarrier with respect to the fifth to eighth layers. Mapping is performed thereafter.

The first group of codes and the second group of codes are mirrors in column to each other, that is, they form a pair of code groups. The third group of codes and the fourth group of codes are mirrors in column to each other, that is, they also form a pair of code groups. The first to fourth layers can be differentiated from the fifth and eighth layers in the form of FDM, that is, they are differentiated by frequencies. At this time, the length of the codes should be 4.

As should be noted under such a circumstance, the pair of code groups formed by the first group of codes and the second group of codes can either be identical with or different from the pair of code groups formed by the third group of codes and the fourth group of codes. However, groups of column serial number distinguishable code group pairs are preferably used. The first to fourth layers make up the first group of frequency resource elements used for RS transmission, and the fifth to eighth layers make up the second group of frequency resource elements used for RS transmission. But the above is merely taken as examples, as the first group of frequency resource elements used for RS transmission may as well be frequency resource elements used for RS transmission of the first, the second, the fifth and the sixth layers, and the second group of frequency resource elements used for RS transmission may as well be frequency resource elements used for RS transmission of the third, the fourth, the seventh and the eighth layers.

As can be seen from FIG. 6 and FIG. 7, the code sequences are spectrum-spread at the time domain, that is, RSs corresponding to the same subcarrier on the sixth, the seventh, the thirteenth and the fourteenth OFDM symbols constitute spectrum-spread codes each having a length of 4. Moreover, RSs corresponding to the $k^{th}$ and the $k+6^{th}$ subcarriers on the sixth, the seventh, the thirteenth and the fourteenth OFDM symbols also constitute spectrum-spread codes each having a length of 4; that is to say, orthogonality is provided in the two dimensions of time and frequency.

Figure 8:
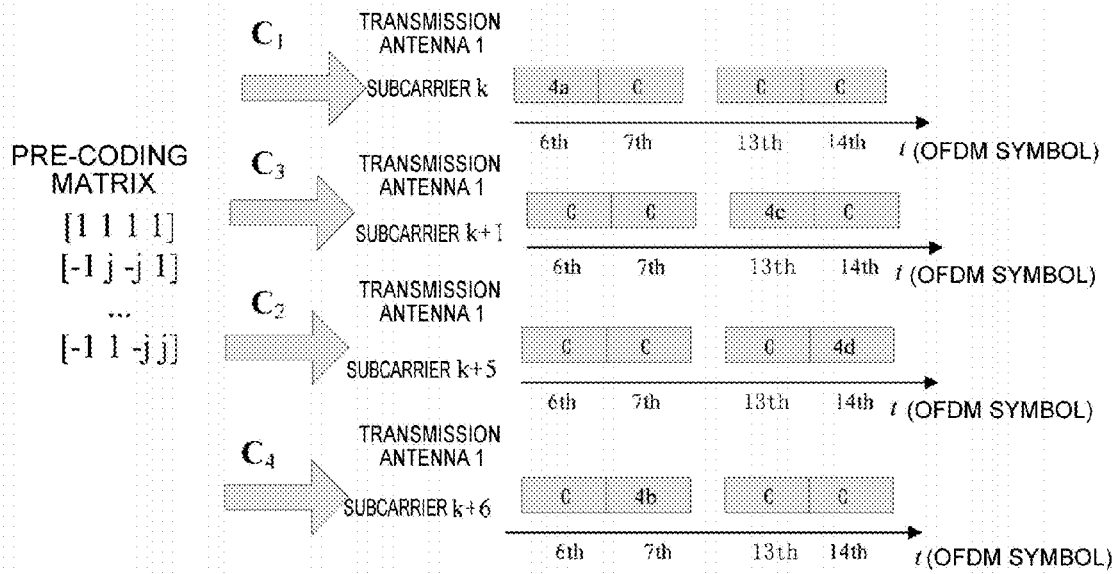
FIG. 8 is a schematic diagram illustrating power distribution of four groups of pre-coded code sequences (column serial number distinguishable code group pairs) generated according to the present invention mapped to the first transmission antenna.

FIG. 8 is a schematic diagram illustrating power distribution of four groups of pre-coded code sequences (groups of column serial number distinguishable code group pairs) generated according to the present invention mapped to the first transmission antenna. As can be seen from FIG. 8, if the row vectors in the pre-coding matrices are all 1, after column vectors of the four groups of code sequence matrices $C_1 \sim C_4$ are respectively multiplied with and added to the row vectors of the pre-coding matrices, RSs corresponding to the sixth, the seventh, the thirteenth and the fourteenth OFDM symbols are respectively 4a, 0, 0, 0 on the $k^{th}$ subcarrier; RSs corresponding to the sixth, the seventh, the thirteenth and the fourteenth OFDM symbols are respectively 0, 0, 4c, 0 on the $k-1^{th}$ subcarrier; RSs corresponding to the sixth, the seventh, the thirteenth and the fourteenth OFDM symbols are respectively 0, 0, 0, 4d on the $k-6^{th}$ subcarrier; and RSs corresponding to the sixth, the seventh, the thirteenth and the fourteenth OFDM symbols are respectively 0, 4b, 0, 0 on the $k-7^{th}$ subcarrier. As it is not difficult to see, power of the RSs is uniformly distributed on the four OFDM symbols, and the problem of power imbalance is avoided.

Figure 9:
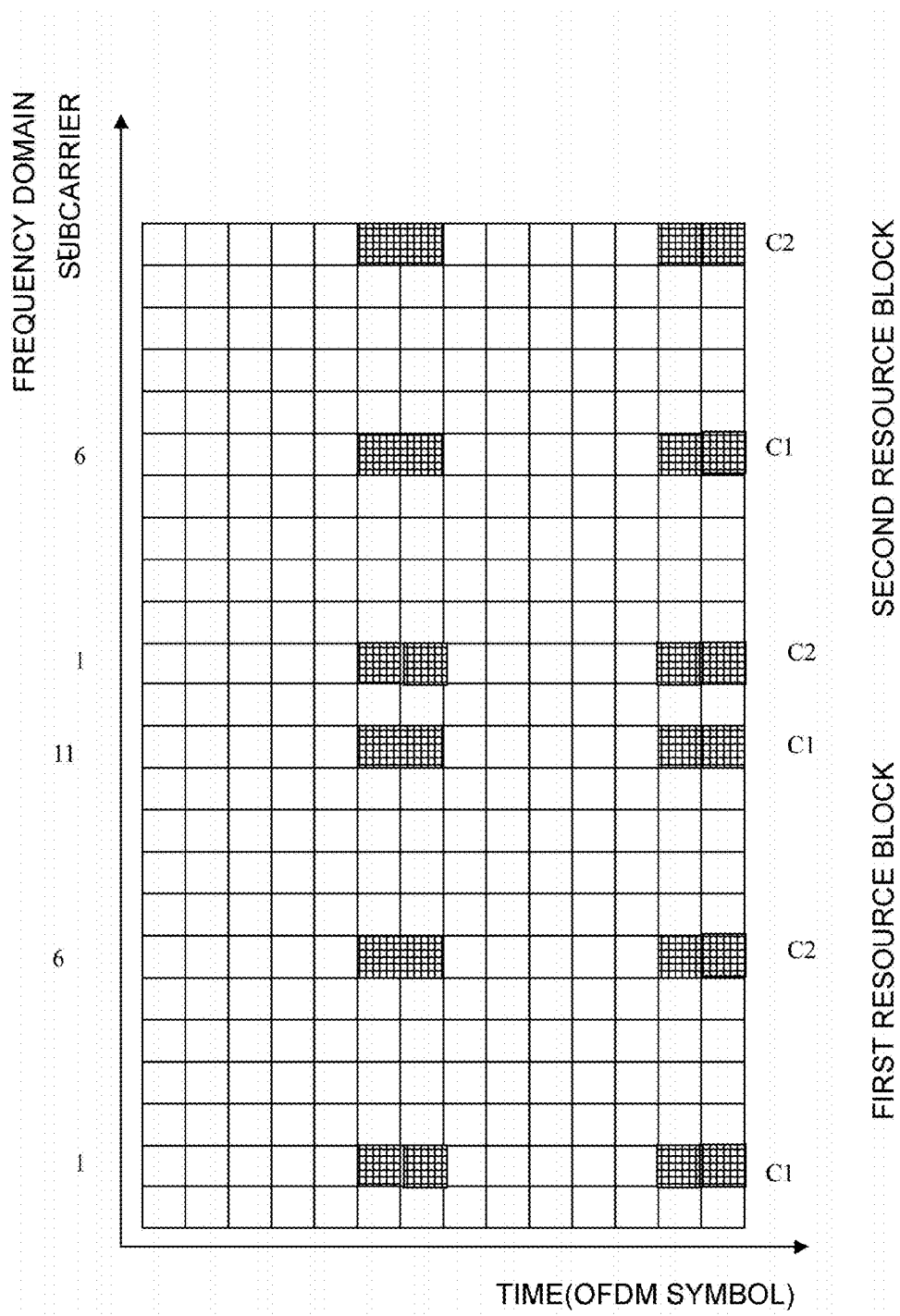
FIGS. 9 and 10 illustrate the spectrum spreading treatment of the second resource block according to one embodiment of the present invention.
Figure 10:
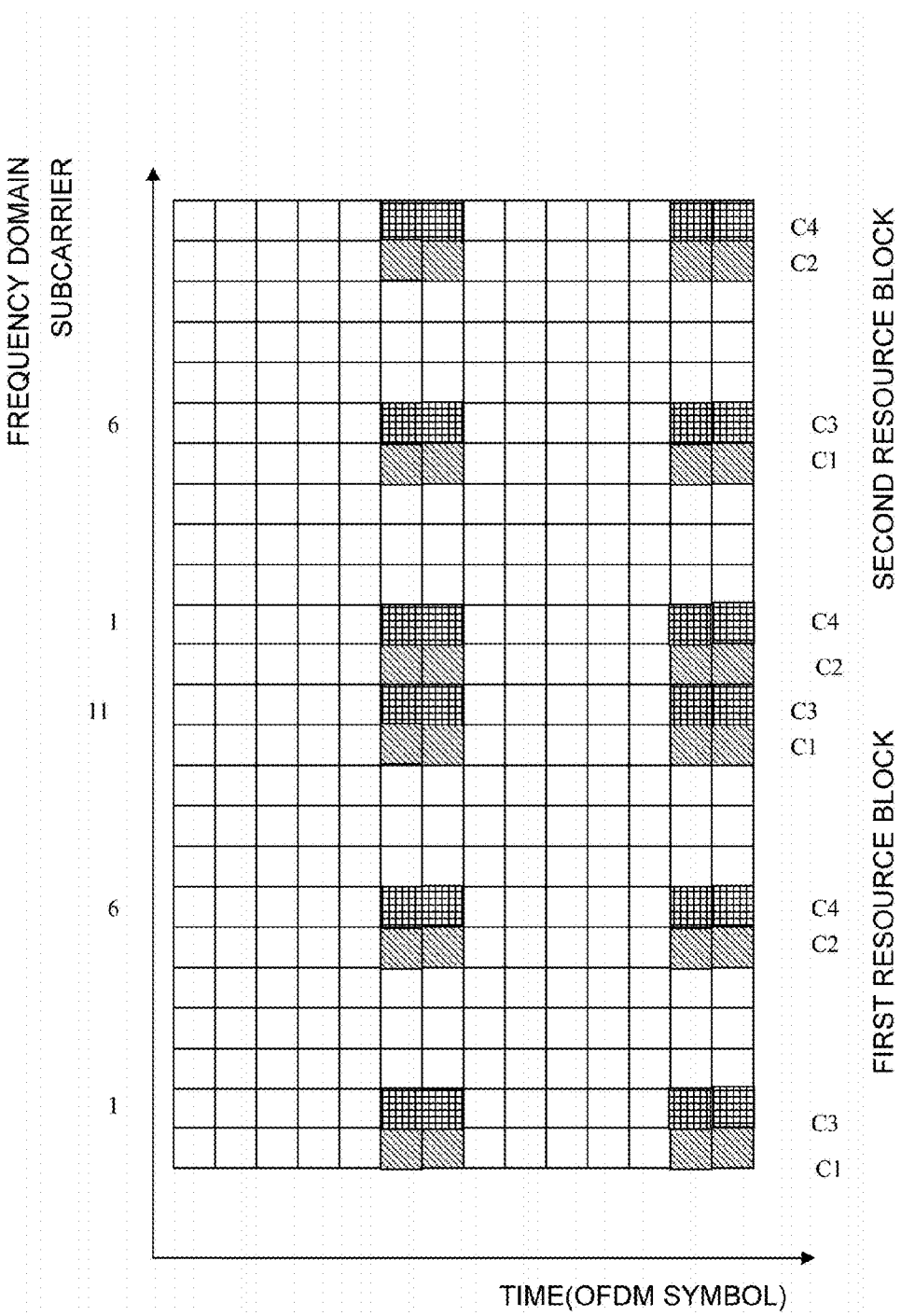

FIGS. 9 and 10 illustrate the spectrum spreading treatment of the second resource block according to one embodiment of the present invention.

According to one embodiment of the present invention, as shown in FIGS. 9 and 10, as for an adjacent resource block (the second resource block in FIGS. 9 and 10, for instance), demodulation reference signals can be generated by the same mode as the original resource block (the first resource block in FIGS. 9 and 10, for instance); moreover, the groups of codes as applied between the two resource blocks are made to be mirrors in column to each other with respect to the adjacent frequency resources of RS transmission for the same layers, namely to form a pair of code groups. For instance, as shown in FIG. 10, with respect to the tenth subcarrier of the first resource block and the $0^{th}$ subcarrier of the second resource block, the groups of codes C1 and C2 as mirrors in column to each other are used; with respect to the eleventh subcarrier of the first resource block and the first subcarrier of the second resource block, the groups of codes C3 and C4 as mirrors in column to each other are used. For further instance, as shown in FIG. 9, with respect to the eleventh subcarrier of the first resource block and the first subcarrier of the second resource block, the groups of codes C1 and C2 as mirrors in column to each other are used.

As should be noted, as shown in FIGS. 9 and 10, the first frequency resource and the second frequency resource may indicate different subcarriers at different resource blocks.

Figure 11:
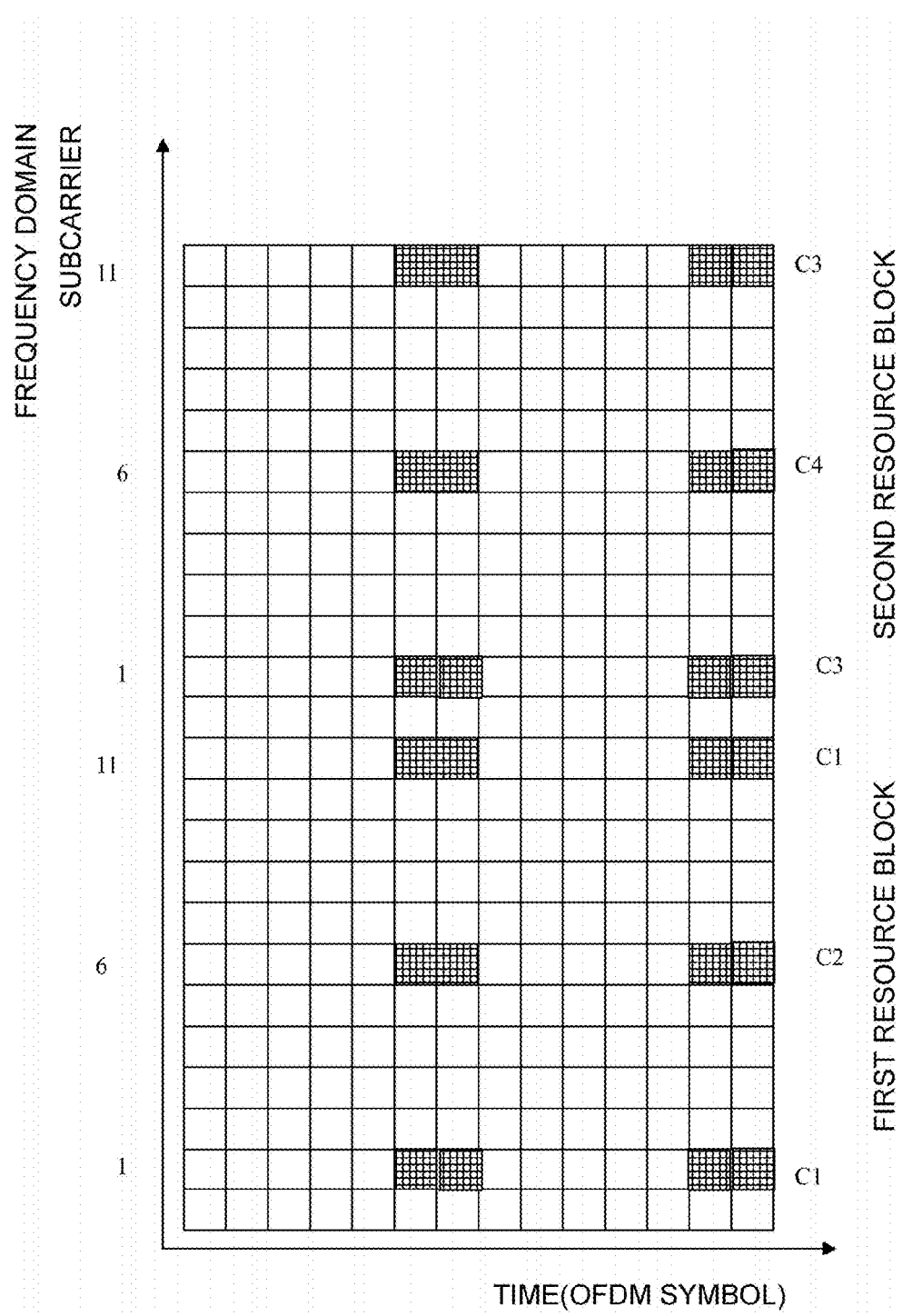
FIGS. 11 and 12 illustrate the spectrum spreading treatment of the second resource block according to another embodiment of the present invention.
Figure 12:
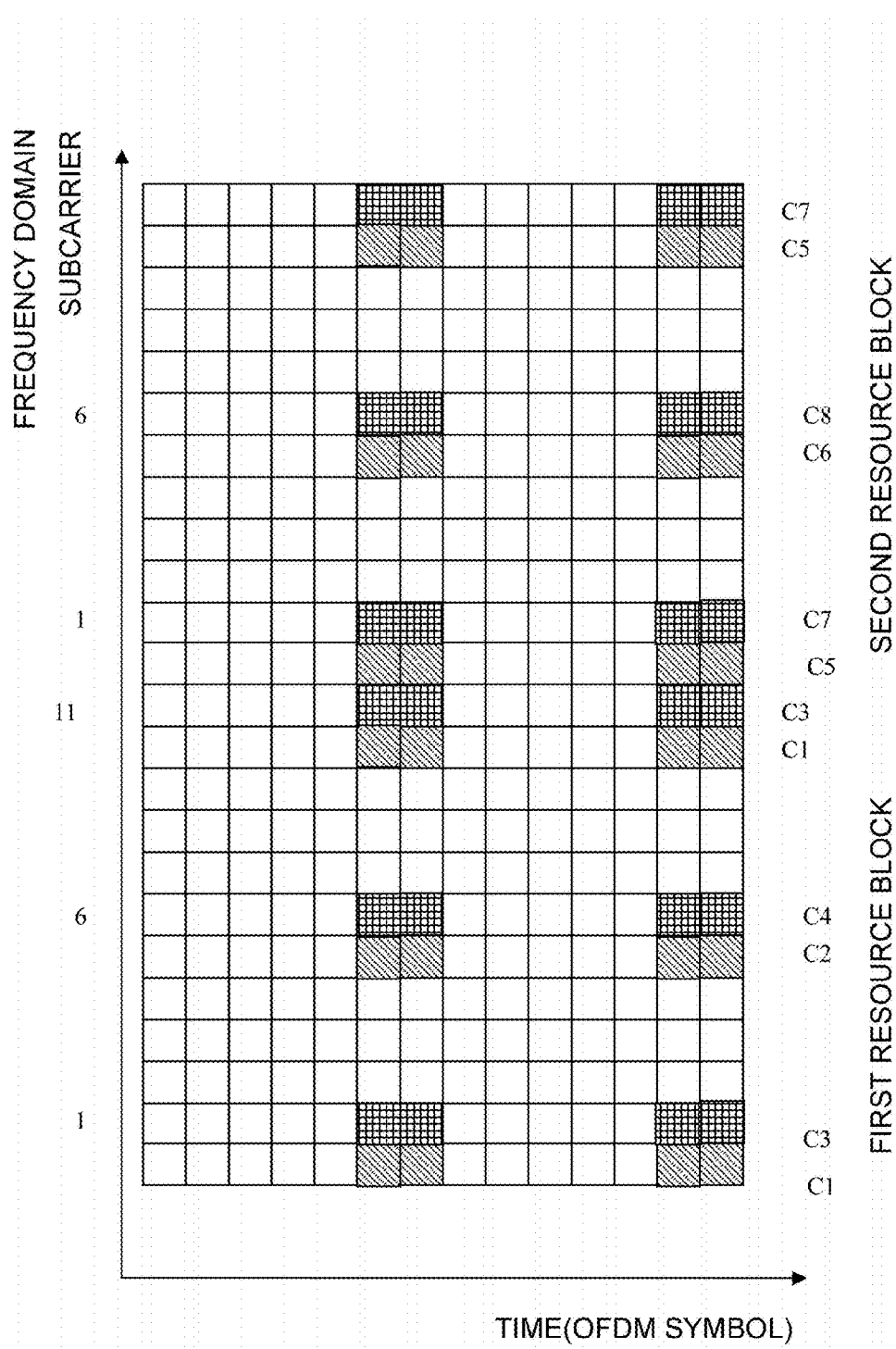

FIGS. 11 and 12 illustrate the spectrum spreading treatment of the second resource block according to another embodiment of the present invention.

According to another embodiment of the present invention, as shown in FIGS. 11 and 12, with respect to adjacent resource blocks, two groups of codes as mirrors in column to each other are used. As shown in FIG. 11, different pairs of code groups are used in the second resource block for frequency resources (the first, the sixth and the eleventh subcarriers in the second resource block, for instance) corresponding to the frequency resources (the first, the sixth and the eleventh subcarriers in the first resource block, for instance) in the original resource block. Preferably, the two pairs of code groups form a group of column serial number distinguishable code group pairs. For further instance as shown in FIG. 12, different pairs of code groups are used in the second resource block for frequency resources corresponding to the frequency resources in the original resource block. The pairs of code groups used in the adjacent resource block also form a group of column serial number distinguishable code group pairs. One group of codes in the group of column serial number distinguishable code group pairs used in the second resource block is obtained by performing column vector cyclic shift on one group of codes in the group of column serial number distinguishable code group pairs used in the first resource block.

Figure 13:
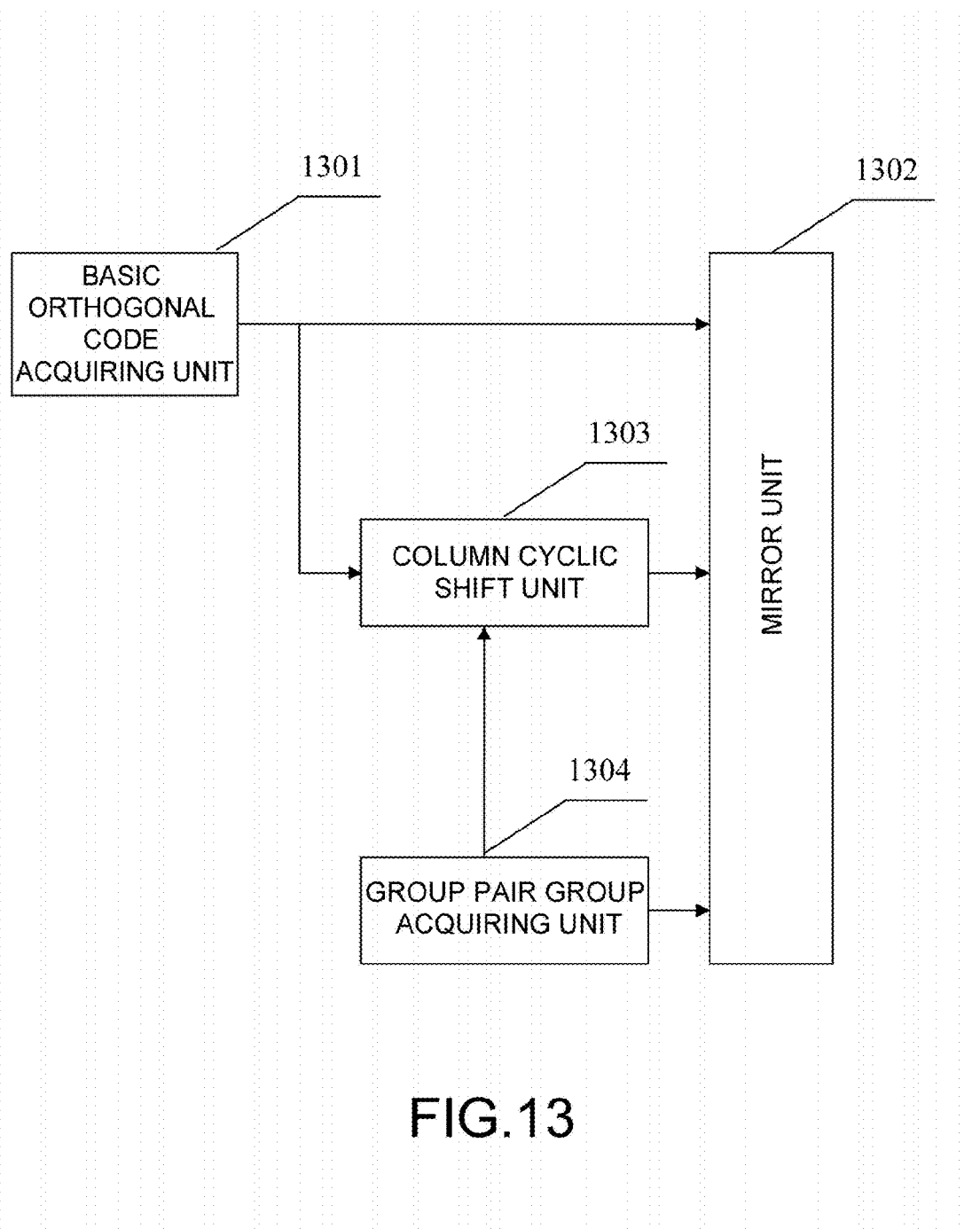
FIG. 13 is a schematic diagram illustrating an code generating apparatus according to one embodiment of the present invention.

FIG. 13 is a schematic diagram illustrating an code generating apparatus according to one embodiment of the present invention.

As shown in FIG. 13, the code generating apparatus according to the present invention includes a basic orthogonal code acquiring unit 1301, a mirror unit 1302, a column cyclic shift unit 1303 and a group pair group acquiring unit 1304.

The basic orthogonal code acquiring unit 1301 is configured to acquire a group of basic orthogonal codes, such as the Walsh codes or DFT codes as previously mentioned.

The column cyclic shift unit 1303 is configured to perform a column vector cyclic shift to the basic orthogonal codes generated by the basic orthogonal code acquiring unit 1301. Displacement of the column vector cyclic shift is variable.

The mirror unit 1302 is configured to perform a mirroring in column on the basic orthogonal codes generated by the basic orthogonal code acquiring unit 1301, so as to obtain a first basic orthogonal code group pair, and further to perform a mirroring in column on the basic orthogonal codes having undergone the cyclic shift by the column cyclic shift unit 1303, so as to obtain a second, a third, or more code group pairs.

The group pair group acquiring unit 1304 is configured to control the column cyclic shift unit 1303 and the mirror unit 1302, so as to obtain a group of column serial number distinguishable code group pairs.

As should be noted, the group pair group acquiring unit 1304 can be dispensed with in certain applications.

Under certain circumstances, the column cyclic shift unit 1303 can also be dispensed with.

Various constituent modules, units and subunits in the above apparatus may be configured through software, firmware, hardware or combinations thereof. The specific configuring means or manners are well known by a person skilled in the art, and herein are not repeated. In case of the implementation through software or firmware, programs constructing the software shall be installed from a storage medium or network to a computer with dedicated hardware structure (e.g., a general computer as illustrated in FIG. 14), and the computer can perform various functions when being installed with various programs.

Figure 14:
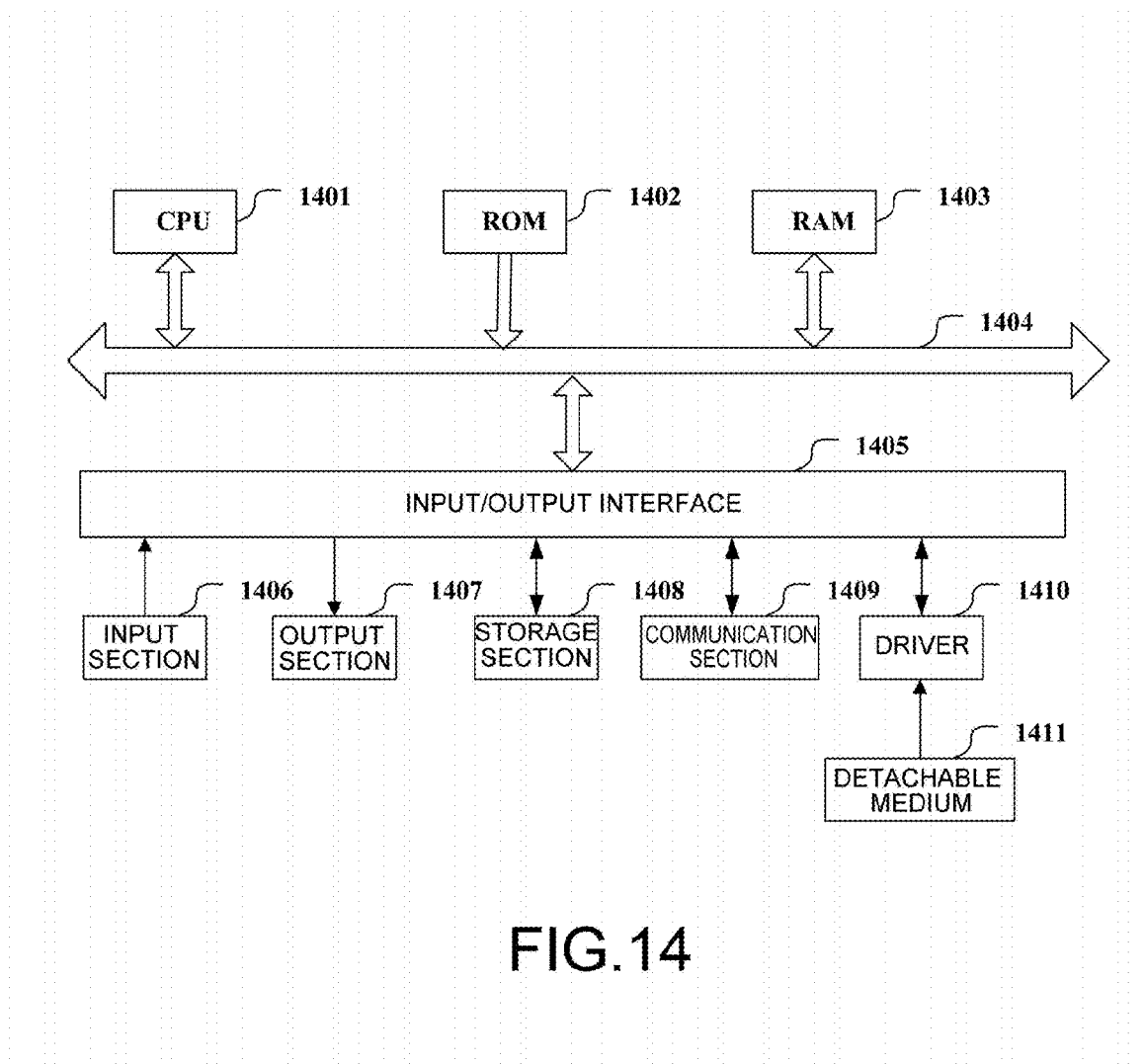
FIG. 14 is a block diagram exemplarily illustrating a computer capable of implementing the method and apparatus according to the embodiments of the present invention.

FIG. 14 is a block diagram illustrating a computer capable of implementing the method and apparatus according to the embodiments of the present invention.

In FIG. 14, a Central Processing Unit (CPU) 1401 performs various processing according to programs stored in a Read Only Memory (ROM) 1402 or programs loaded from a storage section 1408 to a Random Access Memory (RAM) 1403. Data required by the CPU 1401 to perform various processing shall be stored in the RAM 1403 as necessary. The CPU 1401, the ROM 1402 and the RAM 1403 are connected to each other via a bus 1404. An Input/Output (I/O) interface 1405 may also be connected to the bus 1404 as necessary.

As necessary, the following components may be connected to the I/O interface 1405: an input section 1406 (including keypad, mouse, etc.), an output section 1407 (including display such as Cathode-Ray Tube (CRT) and Liquid Crystal Display (LCD), and loudspeaker, etc.), a storage section 1408 (including hard disk, etc.) and a communication section 1409 (including network interface card such as LAN card, modem, etc.). The communication section 1409 for example performs a communication processing through a network such as Internet. A driver 1410 may also be connected to the I/O interface 1405 as necessary. A detachable medium 1411 such as magnetic disk, optical disk, magneto-optical disk, semiconductor memory, etc. may be mounted on the driver 1410 as necessary, so that the computer program read therefrom will be installed into the storage section 1408 upon request.

In case the above series of processing is implemented through software, programs constructing the software shall be installed from a network such as the Internet or a storage medium such as the detachable medium 1411.

A person skilled in the art shall appreciate that the storage medium is not limited to the detachable medium 1411 as illustrated in FIG. 14 which stores programs and is distributed independently from the device to provide the programs to the subscriber. The detachable medium 1411 for example includes magnetic disk (including floppy disk (registered trademark)), compact disk (including Compact Disk Read Only Memory (CD-ROM) and Digital Versatile Disk (DVD)), magnetic optical disk (including Mini Disk (MD) (registered trademark)) and semiconductor memory. Or the storage medium may be the ROM 1402, the hard disk in the storage section 1408, etc. in which programs are stored and distributed to the subscriber together with the device containing them.

The present invention further provides a program product that stores machine readable instruction codes capable of executing the above method according to the embodiments of the present invention when being read and executed by a machine.

Accordingly, a storage medium for loading the program product that stores the machine readable instruction codes is also included in the disclosure of the present invention. The storage medium includes, but is not limited to, floppy disk, optical disk, magneto-optical disk, memory card, memory stick, etc.

Figure 15:
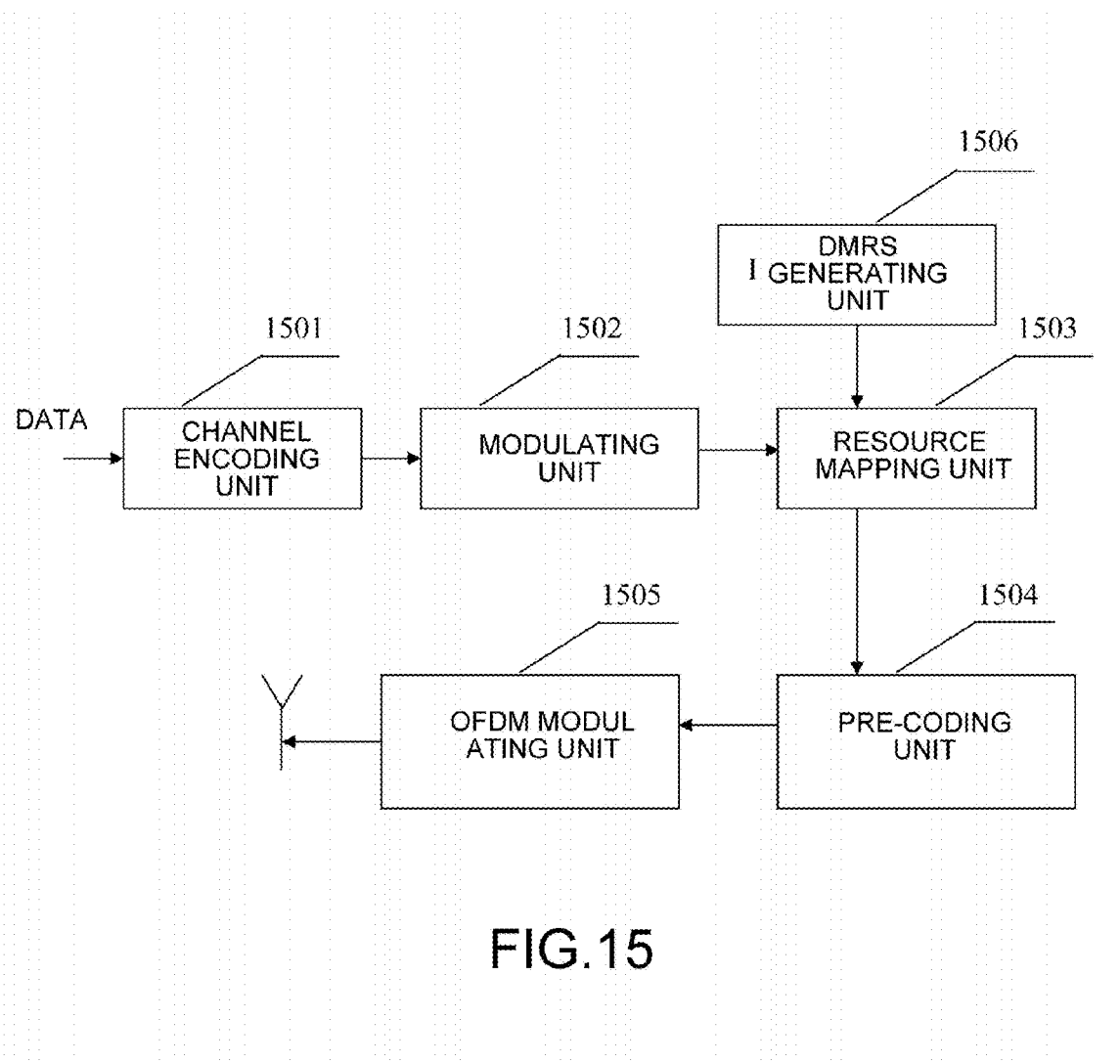
FIG. 15 is a block diagram exemplarily illustrating the function of a transmitter that employs the RS generating apparatus and generation method according to the embodiments of the present invention.

FIG. 15 is a block diagram exemplarily illustrating the function of a transmitter that employs the RS generating apparatus and generation method according to the embodiments of the present invention. A power source, a storage unit, a data generating module and the like which are not of direct relevance to understanding the technical solution of present invention are omitted in this block diagram.

As shown in FIG. 15, data is encoded as to channels at a channel encoding unit 1501, and is then modulated at a modulating unit 1502. The modulated data is mapped as to resources at a resource mapping unit 1503. At the same time, RSs are generated by a RS generating unit 1506 by using the RS generating apparatus or generation method according to the present invention and are mapped. As should be noted, in the above description the RS generating apparatus also has a mapping unit, which is actually the same one as the resource mapping unit 1503, that is to say, data and RSs are mapped at the same time. Thereafter, the data mapped to a physical channel is pre-coded at a pre-coding unit 1504, receives OFDM modulation at an OFDM modulating unit 1505, and is then sent out via an antenna.

Description of the present invention is given for purposes of exemplification and illustration, and is not exhaustive or restrictive of the present invention within the form disclosed herein. Many modifications and variations are apparent to persons ordinarily skilled in the art. The selection and description of the embodiments are directed to better explanation of the principles and practical applications of the present invention, and to enabling persons ordinarily skilled in the art to so comprehend the present invention as to design various embodiments with various modifications adapted to particular purposes of use.

What is claimed is:

1. A transmitter, comprising:
   a reference signal generator configured to generate a reference signal, wherein the reference signal generator comprises:
   a sequence generator configured to generate a sequence for reference signal of a first resource block;
   a first spectrum spreading unit configured to spread spectrums of elements in the sequence for reference signal of the first resource block to be mapped to a first frequency resource of the first resource block, by using a first group of codes;
   a second spectrum spreading unit configured to spread spectrums of elements in the sequence for reference signal of the first resource block to be mapped to a second frequency resource of the first resource block, by using a second group of codes; the first and second frequency resources are adjacent frequency resources in frequency resource elements used for reference signal transmission in the first resource block, and the first and second groups of codes are mirrors in column to each other;
   a third spectrum spreading unit configured to spread spectrums of elements of in the sequence for reference signal of the first resource block to be mapped to a third frequency resource of the first resource block, by using a third group of codes;
   a fourth spectrum spreading unit configured to spread spectrums of elements in the sequence for reference signal of the first resource block to be mapped to a fourth frequency resource of the first resource block, by using a fourth group of codes; the third and fourth frequency resources are adjacent frequency resources in frequency resource elements used for reference signal transmission in the first resource block, and the third and fourth groups of codes are mirrors in column to each other; and
   a mapping unit configured to map the elements with their spectrums spread by the first and second spectrum spreading units to the first and second frequency resources of the first resource block, respectively, and map the elements with their spectrums spread by the third and fourth spectrum spreading units to the third and fourth frequency resources of the first resource block, respectively.

2. The transmitter according to claim 1, wherein one of the third and fourth groups of codes is formed by performing a column vector cyclic shift to one of the first and second groups of codes, and the same column vector has different column serial numbers in the first to fourth groups of codes.

3. A communication system, comprising:
   a transmitter that transmits a reference signal; and
   a receiver that receives the reference signal transmitted from the transmitter, wherein the transmitter includes a reference signal generator configured to generate the reference signal which comprises:
   a sequence generator configured to generate a sequence for reference signal of a first resource block;
   a first spectrum spreading unit configured to spread spectrums of elements in the sequence for reference signal of the first resource block to be mapped to a first frequency resource of the first resource block, by using a first group of codes;

a second spectrum spreading unit configured to spread spectrums of elements in the sequence for reference signal of the first resource block to be mapped to a second frequency resource of the first resource block, by using a second group of codes; the first and second frequency resources are adjacent frequency resources in frequency resource elements used for reference signal transmission in the first resource block, and the first and second groups of codes are mirrors in column to each other;

a third spectrum spreading unit configured to spread spectrums of elements of in the sequence for reference signal of the first resource block to be mapped to a third frequency resource of the first resource block, by using a third group of codes;

a fourth spectrum spreading unit configured to spread spectrums of elements in the sequence for reference signal of the first resource block to be mapped to a fourth frequency resource of the first resource block, by using a fourth group of codes; the third and fourth frequency resources are adjacent frequency resources in frequency resource elements used for reference signal transmission in the first resource block, and the third and fourth groups of codes are mirrors in column to each other; and a mapping unit configured to map the elements with their spectrums spread by the first and second spectrum spreading units to the first and second frequency resources of the first resource block, respectively, and map the elements with their spectrums spread by the third and fourth spectrum spreading units to the third and fourth frequency resources of the first resource block, respectively.

4. A method for transmitting a reference signal, comprising:

a sequence generating step for generating a sequence for reference signal of a first resource block;

a first spectrum spreading step for spreading spectrums of elements in the sequence for reference signal of the first resource block to be mapped to a first frequency resource of the first resource block, by using a first group of codes;

a second spectrum spreading step for spreading spectrums of elements in the sequence for reference signal of the first resource block to be mapped to a second frequency resource of the first resource block, by using a second group of codes; the first and second frequency resources are adjacent frequency resources in frequency resource elements used for reference signal transmission in the first resource block, and the first and second groups of codes are mirrors in column to each other;

a third spectrum spreading step for spreading spectrums of elements of in the sequence for reference signal of the first resource block to be mapped to a third frequency resource of the first resource block, by using a third group of codes;

a fourth spectrum spreading step for spreading spectrums of elements in the sequence for reference signal of the first resource block to be mapped to a fourth frequency resource of the first resource block, by using a fourth group of codes; the third and fourth frequency resources are adjacent frequency resources in frequency resource elements used for reference signal transmission in the first resource block, and the third and fourth groups of codes are mirrors in column to each other;

a mapping step for mapping the elements with their spectrums spread by the first and second spectrum spreading units to the first and second frequency resources of the first resource block, respectively, and map the elements with their spectrums spread by the third and fourth spectrum spreading units to the third and fourth frequency resources of the first resource block, respectively; and a transmitting step for transmitting the generated reference signal to a receiver.

* * * * *